(12) United States Patent
Freitag et al.

(10) Patent No.: US 10,962,511 B2
(45) Date of Patent: Mar. 30, 2021

(54) SYSTEMS FOR A MODULAR MULTI-WAVELENGTH ABSORBANCE DETECTOR

(71) Applicant: Phoseon Technology, Inc., Hillsboro, OR (US)

(72) Inventors: John Christopher Freitag, Lake Oswego, OR (US); Shiou-jyh Ja, Portland, OR (US); Brad Scardino, Beaverton, OR (US); Randy James, Beaverton, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 196 days.

(21) Appl. No.: 16/215,428

(22) Filed: Dec. 10, 2018

(65) Prior Publication Data

US 2019/0178856 A1 Jun. 13, 2019

Related U.S. Application Data

(60) Provisional application No. 62/597,723, filed on Dec. 12, 2017.

(51) Int. Cl.
*G01N 30/74* (2006.01)
*G01N 21/05* (2006.01)
(Continued)

(52) U.S. Cl.
CPC ............. *G01N 30/74* (2013.01); *G01N 21/05* (2013.01); *G01N 2030/027* (2013.01);
(Continued)

(58) Field of Classification Search
CPC ........... G01N 30/74; G01N 2030/8881; G01N 2035/00306; G01N 2201/0225;
(Continued)

(56) References Cited

U.S. PATENT DOCUMENTS 5,434,664 A * 7/1995 Sapp ...................... G01N 21/05
356/244
7,837,348 B2 * 11/2010 Narendran .............. F21V 5/004
362/231

(Continued)

FOREIGN PATENT DOCUMENTS

EP     2124036 A1 * 11/2009 ............. G01N 21/05
WO    8300389 A1    2/1983

OTHER PUBLICATIONS

ISA Korean Intellectual Property Office, International Search Report and Written Opinion Issued in Application No. PCT/US2018/064790, dated Mar. 15, 2019, WIPO, 15 pages.

*Primary Examiner* — Justin N Olamit
(74) *Attorney, Agent, or Firm* — McCoy Russell LLP

(57) ABSTRACT

Systems are provided for a modular multi-wavelength UV-VIS detector unit, such as an absorbance detector (e.g., spectrophotometer) included in a high-performance liquid chromatography system. In one example, a detector unit includes one or more light emitters and a sliding assembly configured to slidingly move a flow cell relative to the one or more light emitters, the one or more light emitters mounted on a floating rig to facilitate alignment between the one or more light emitters and the flow cell when the sliding assembly is in a closed position.

18 Claims, 18 Drawing Sheets

(51) Int. Cl.
*G01N 30/02* (2006.01)
*G01N 35/00* (2006.01)
*G01N 30/88* (2006.01)

(52) U.S. Cl.
CPC ........ *G01N 2030/8881* (2013.01); *G01N 2035/00306* (2013.01); *G01N 2201/0225* (2013.01); *G01N 2201/0245* (2013.01)

(58) Field of Classification Search
CPC ......... G01N 2201/0245; G01N 21/05; G01N 2021/0052–058
See application file for complete search history.

(56) References Cited

U.S. PATENT DOCUMENTS

| | | | |
|---|---|---|---|
| 8,612,161 B2* | 12/2013 | Gordon | C12Q 1/6869 702/20 |
| 2010/0240063 A1 | 9/2010 | Hayes et al. | |
| 2010/0291619 A1 | 11/2010 | Robinson et al. | |
| 2012/0127456 A1* | 5/2012 | Frojdh | G01N 21/33 356/51 |
| 2013/0214174 A1 | 8/2013 | Domenig et al. | |
| 2014/0154792 A1 | 6/2014 | Moynihan et al. | |
| 2017/0336371 A1 | 11/2017 | Schulz et al. | |

\* cited by examiner

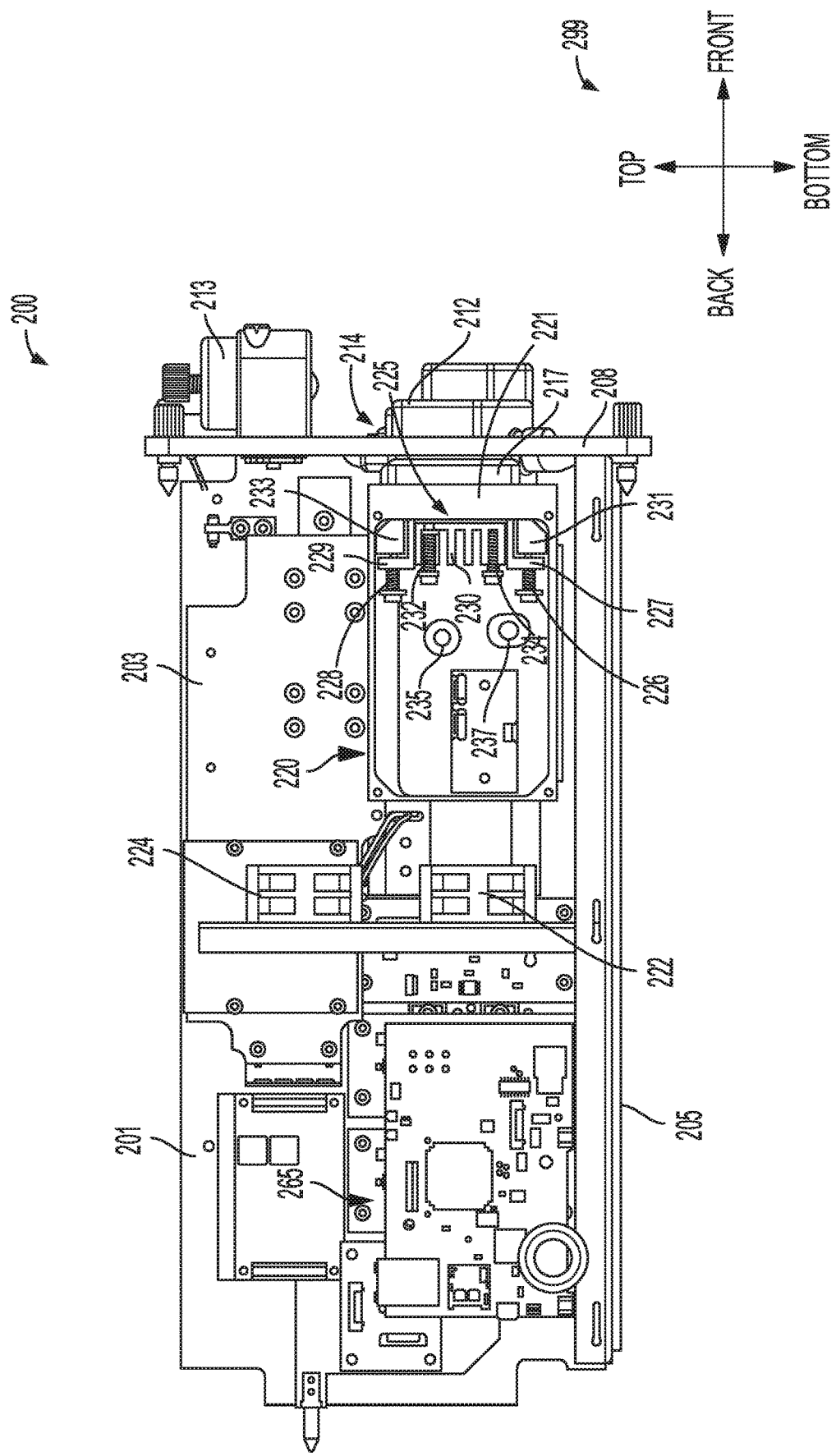

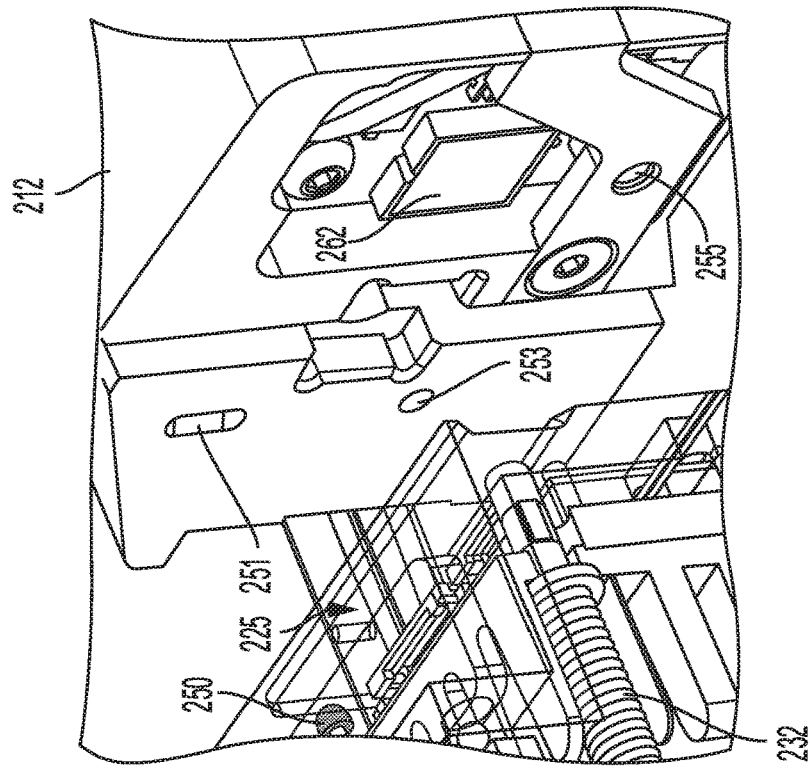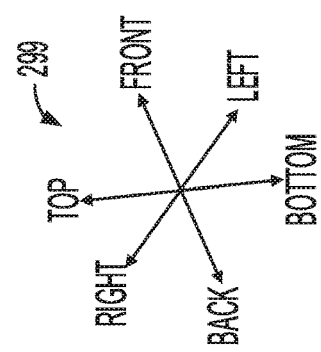
FIG. 13
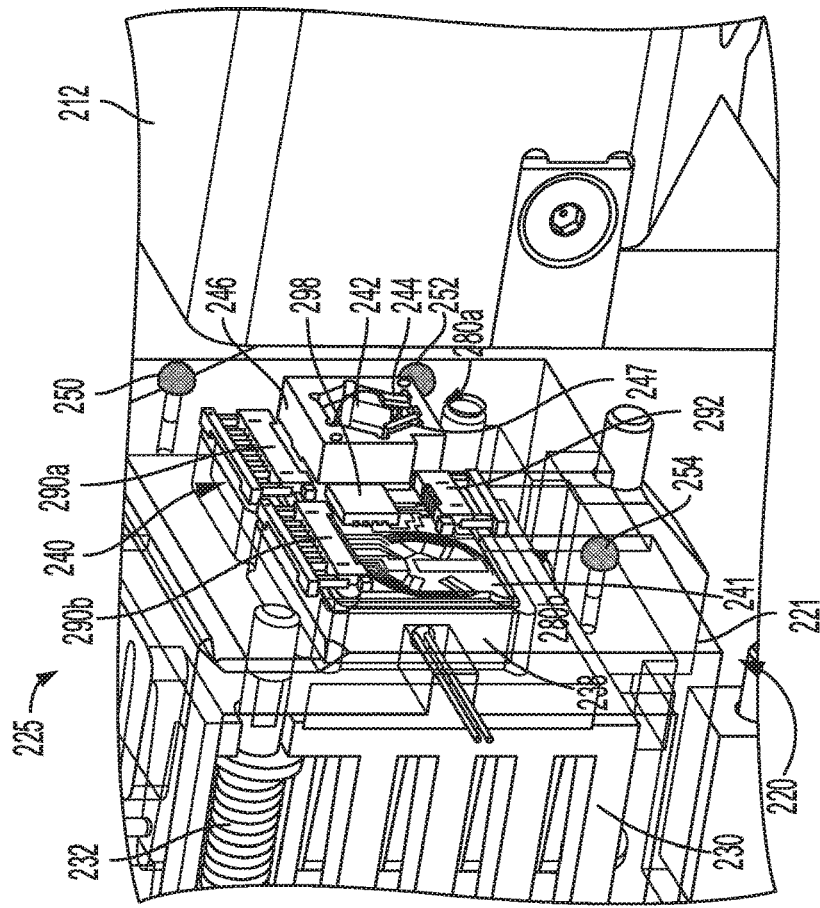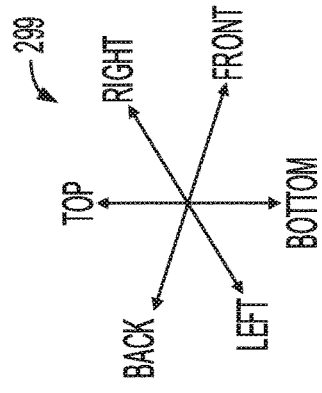
FIG. 12

SYSTEMS FOR A MODULAR MULTI-WAVELENGTH ABSORBANCE DETECTOR

CROSS REFERENCE TO RELATED APPLICATIONS

The present application claims priority to U.S. Provisional Application No. 62/597,723, entitled "SYSTEMS FOR A MODULAR MULTI-WAVELENGTH ABSORBANCE DETECTOR", and filed on Dec. 12, 2017. The entire contents of the above-listed application are hereby incorporated by reference for all purposes.

BACKGROUND AND SUMMARY

Spectrophotometers quantitatively measure the light reflection or transmission properties of a material as a function of wavelength. UV-VIS spectrophotometers, which utilize light in the ultraviolet (UV) and visible (VIS) regions of the electromagnetic spectrum, are commonly used to detect and identify analytes in liquid samples. For example, UV-VIS spectrophotometers (e.g., absorbance detectors) may be included as detectors in liquid chromatography systems, such as high-performance liquid chromatography (HPLC), two-dimensional chromatography, ion chromatography, and ultra-high pressure liquid chromatography (UHPLC) systems. An HPLC system may use one or more pumps to flow a pressurized liquid solvent (also termed "mobile phase") containing a sample mixture through a column filled with a solid adsorbent material (also termed "solid phase"). Each component (e.g., analyte) in the sample mixture interacts with mobile phase and the solid phase differently based on their chemical compositions and structures; components with a higher affinity for the mobile phase will flow through the column more quickly, whereas components with a higher affinity for the solid phase will flow through the column more slowly. The different flow rates of the different components enable components of a complex mixture to be purified, for example. In another example, a specific component may be identified based on an amount of time it remains on the column (e.g., retention time). After each component is eluted from the column, the respective component may flow through the detector (e.g., UV-VIS spectrophotometer).

While flowing through a flow cell of the UV-VIS spectrophotometer, each component is exposed to one or more wavelengths of light emitted from one or more light sources (e.g., deuterium lamps, mercury arc lamps, tungsten lamps, light-emitting diodes, and/or laser diodes). The light may be partially to fully absorbed by the component depending on the chemical structure and concentration of the component as well as the wavelength(s) of light used. Any unabsorbed light may pass through the flow cell and be transmitted to a signal detector (e.g., a variable-wavelength detector system or a diode array detector system).

In particular, deuterium lamps, mercury arc lamps, and tungsten lamps are relatively large compared to a typical flow cell of the UV-VIS spectrophotometer. Additionally, the light emitted from these light sources is spatially and spectrally broad, thus requiring optical conditioning. These light sources also have to be pre-warmed before use and typically have a limited life (for example, tungsten lamps has to be replaced after ~2000 hours of use), increasing both the time and the cost of operation of the HPLC system. Therefore, light-emitting diodes (LEDs) are often used for a longer-lasting, smaller, and more cost-effective light source that does not require pre-warming before use.

However, unlike the spectrally broad lamps mentioned above, each LED emits a different wavelength of light. Therefore, the ability of the UV-VIS spectrophotometer to detect a particular analyte may be limited based on the spectral characteristics of the analyte and the configuration of the UV-VIS spectrophotometer (e.g., the emission wavelengths of the included LEDs). The detection needs of a user may change over time. As a result, the user may purchase additional, expensive equipment, such as a second HPLC system or a second UV-VIS spectrophotometer, in order to detect components with spectral characteristics outside of those detectable by a first UV-VIS spectrophotometer. In other examples, a service technician may upgrade the first UV-VIS spectrophotometer, such as by disassembling the first UV-VIS spectrophotometer and installing new components.

The inventors herein have recognized the above-mentioned issues and have engineered a way to at least partially address them. In one example, the issues described above may be addressed by a detector unit for an analyzer. The detector unit may include one or more light emitters and a sliding assembly configured to slidingly move a flow cell relative to the one or more light emitters, the one or more light emitters mounted on a floating rig to facilitate alignment between the one or more light emitters and the flow cell when the sliding assembly is in a closed position.

The above advantages and other advantages and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 5 shows a left side view of the modular multi-wavelength UV-VIS detector unit with the cover removed.

FIG. 12 shows a first angled view illustrating alignment of the light engine with the flow cell access drawer during closing.

FIG. 13 shows a second angled view illustrating alignment of the light engine with the flow cell access drawer during closing.

FIGS. 2-13 are drawn approximately to scale, although other relative dimensions could be used if desired.

DETAILED DESCRIPTION

Figure 2:
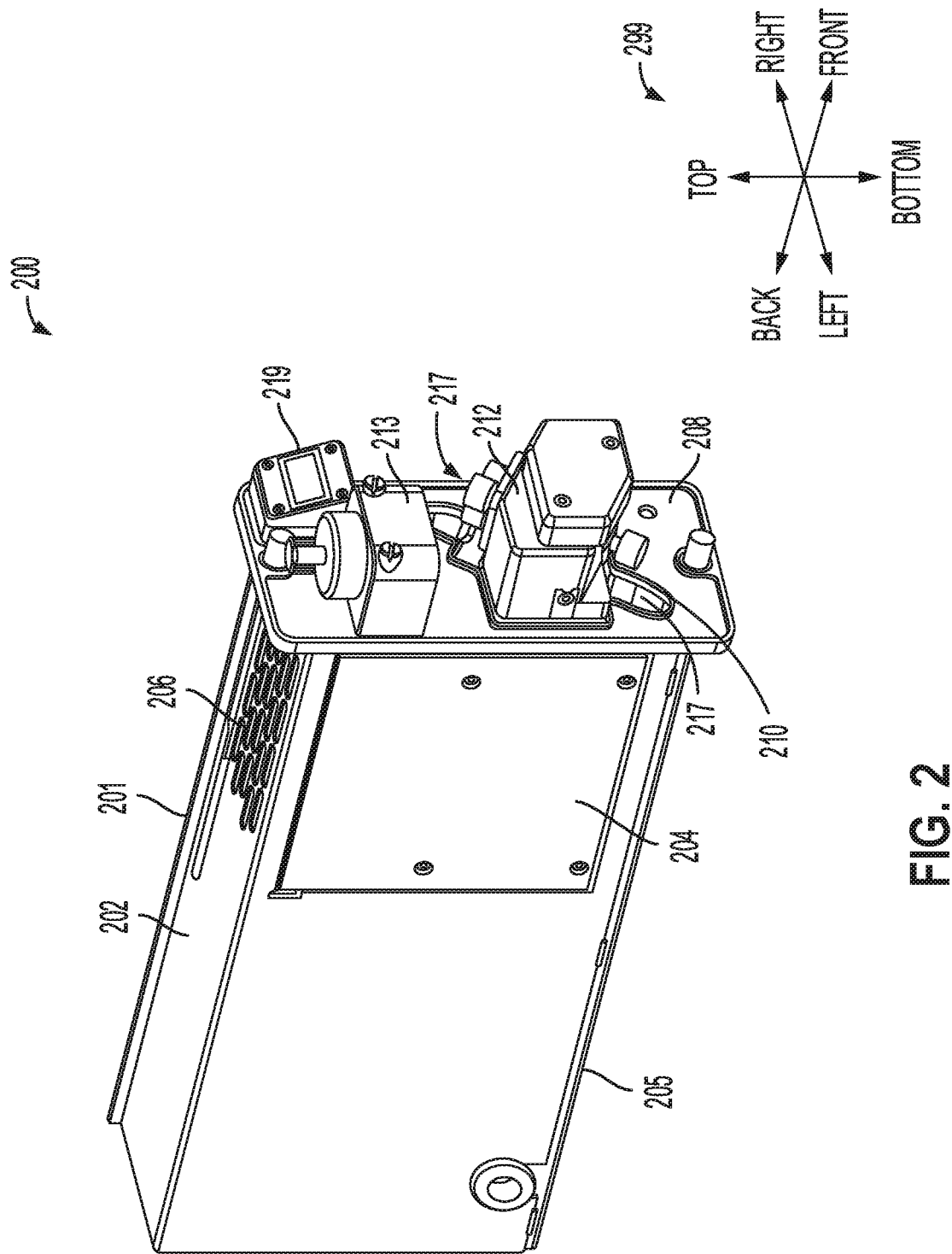
FIG. 2 shows a left isometric view highlighting exterior surfaces of a modular multi-wavelength UV-VIS detector unit that may be included in an HPLC system.
Figure 3:
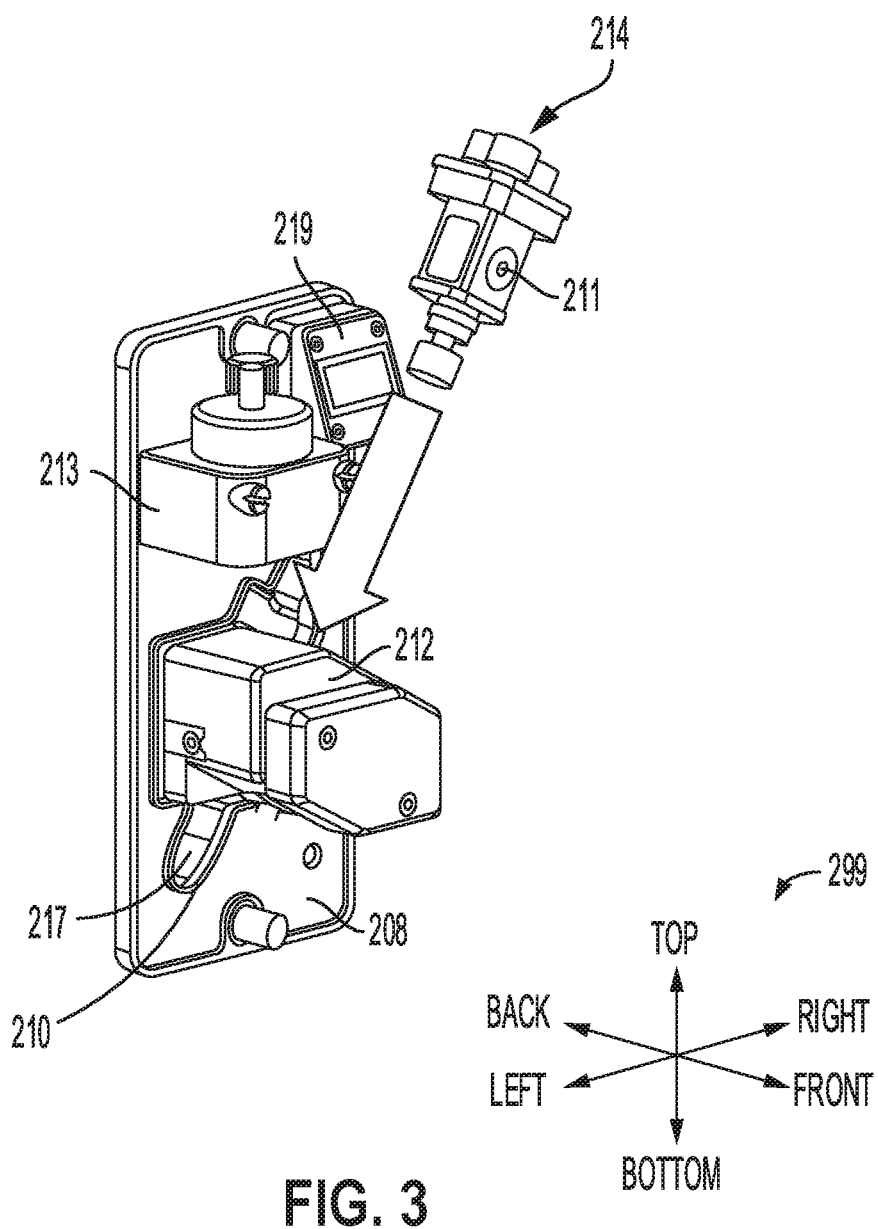
FIG. 3 shows a left isometric view illustrating how a flow cell may be inserted into a flow cell access drawer of the modular multi-wavelength UV-VIS detector unit.
Figure 4:
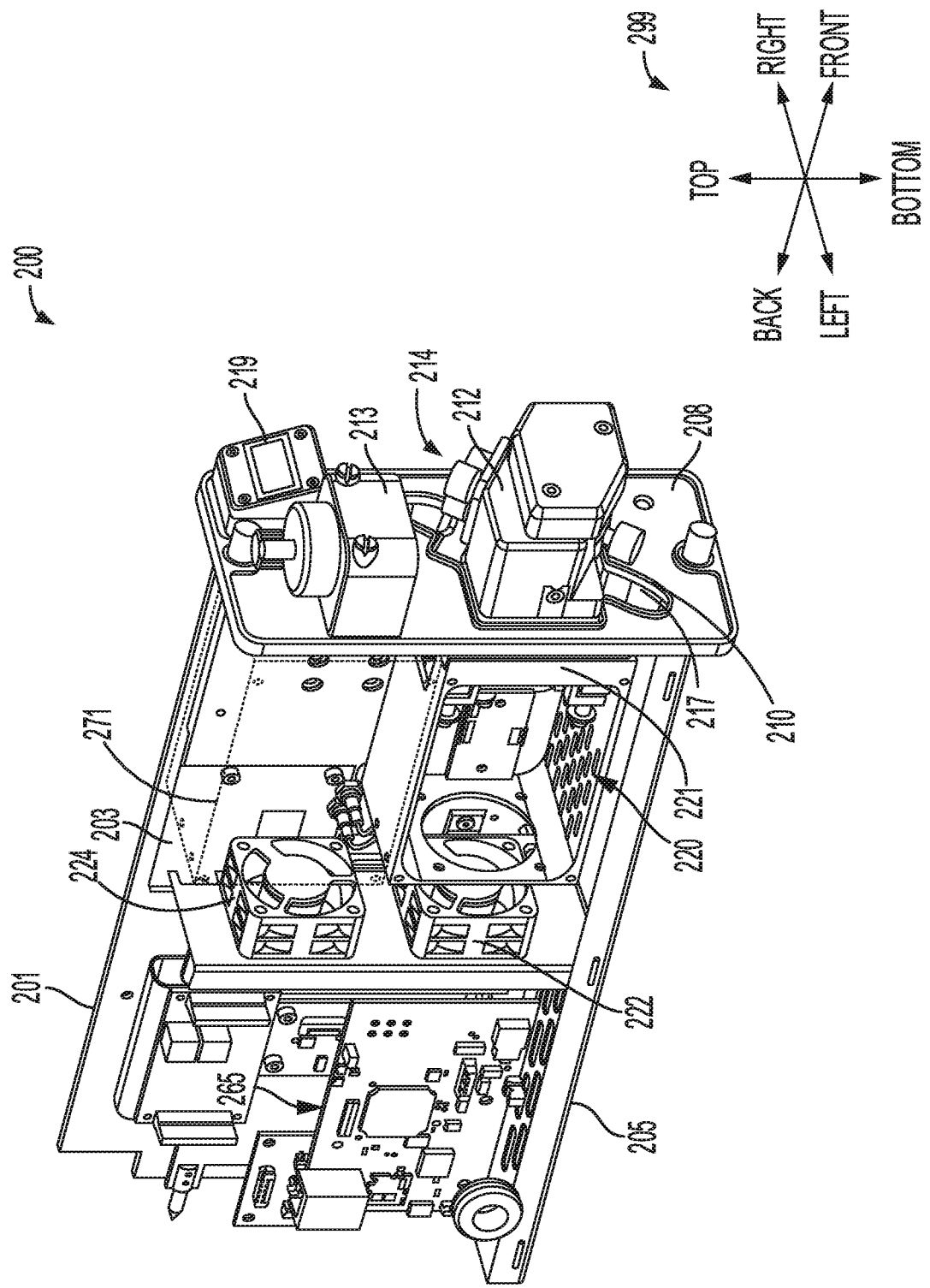
FIG. 4 shows a left isometric view of the modular multi-wavelength UV-VIS detector unit with a cover of the unit removed.
Figure 9:
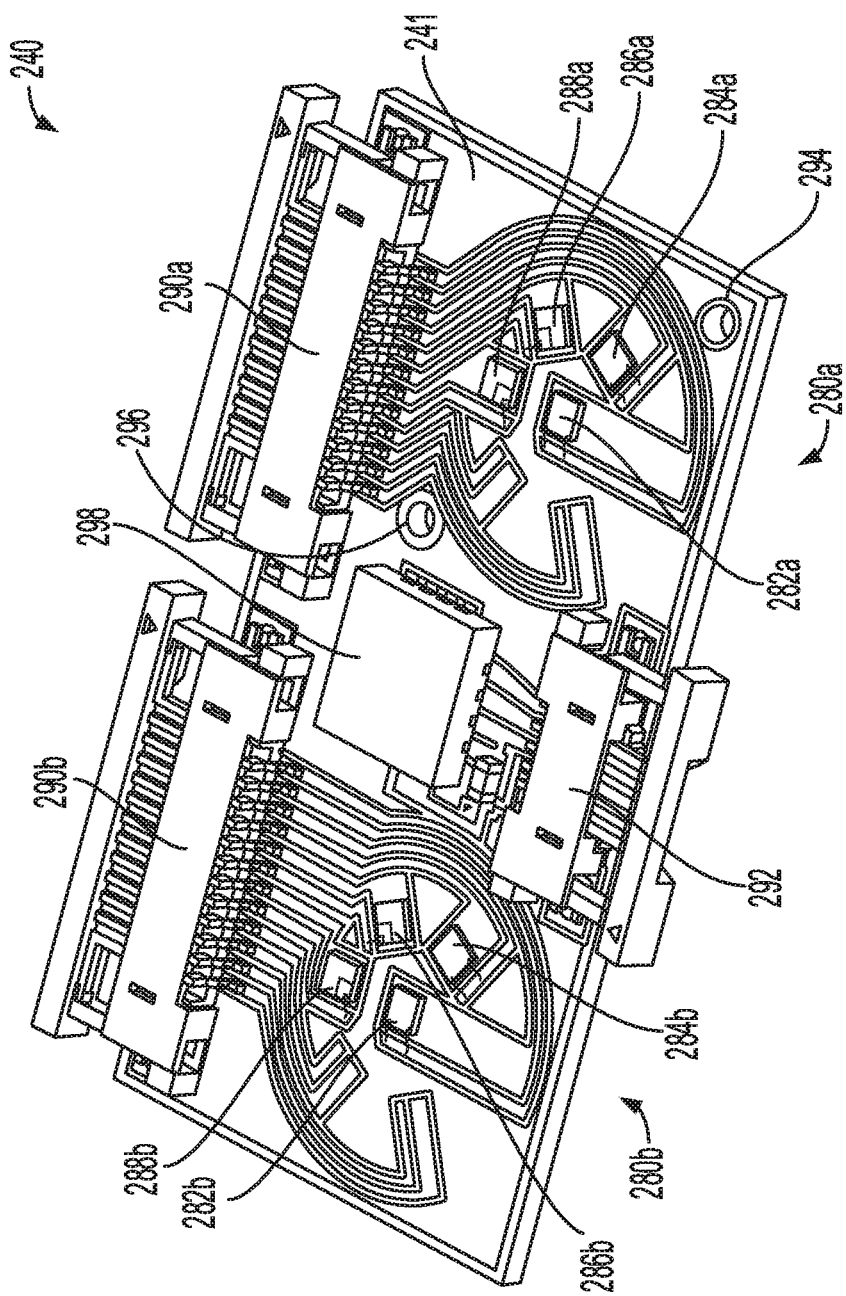
FIG. 9 shows a semi-conductor light matrix that may be included in a light source module of the modular multi-wavelength UV-VIS detector unit.
Figure 10:
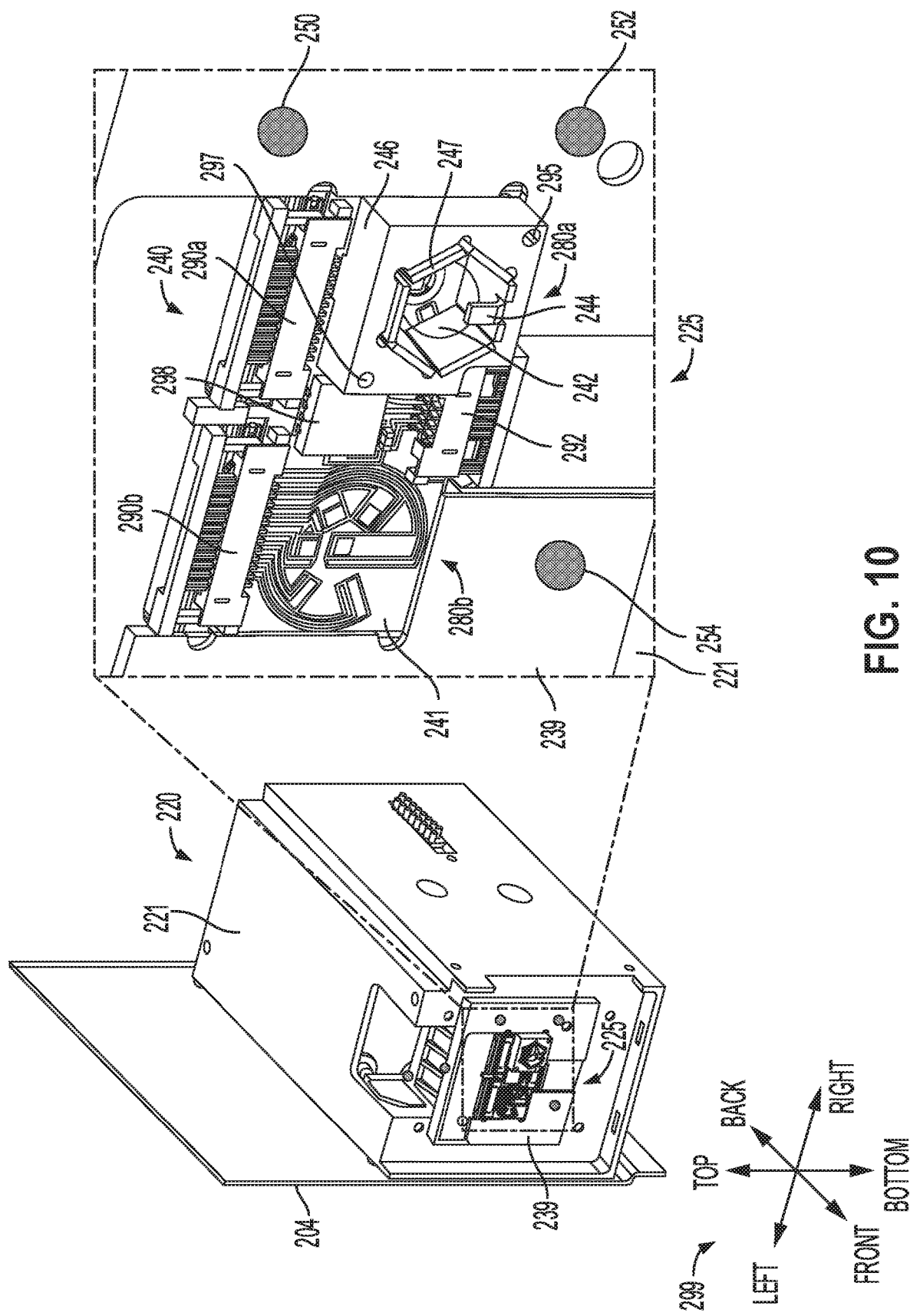
FIG. 10 shows an isometric detailed view of a light engine that may be included in the light source module.
Figure 11:
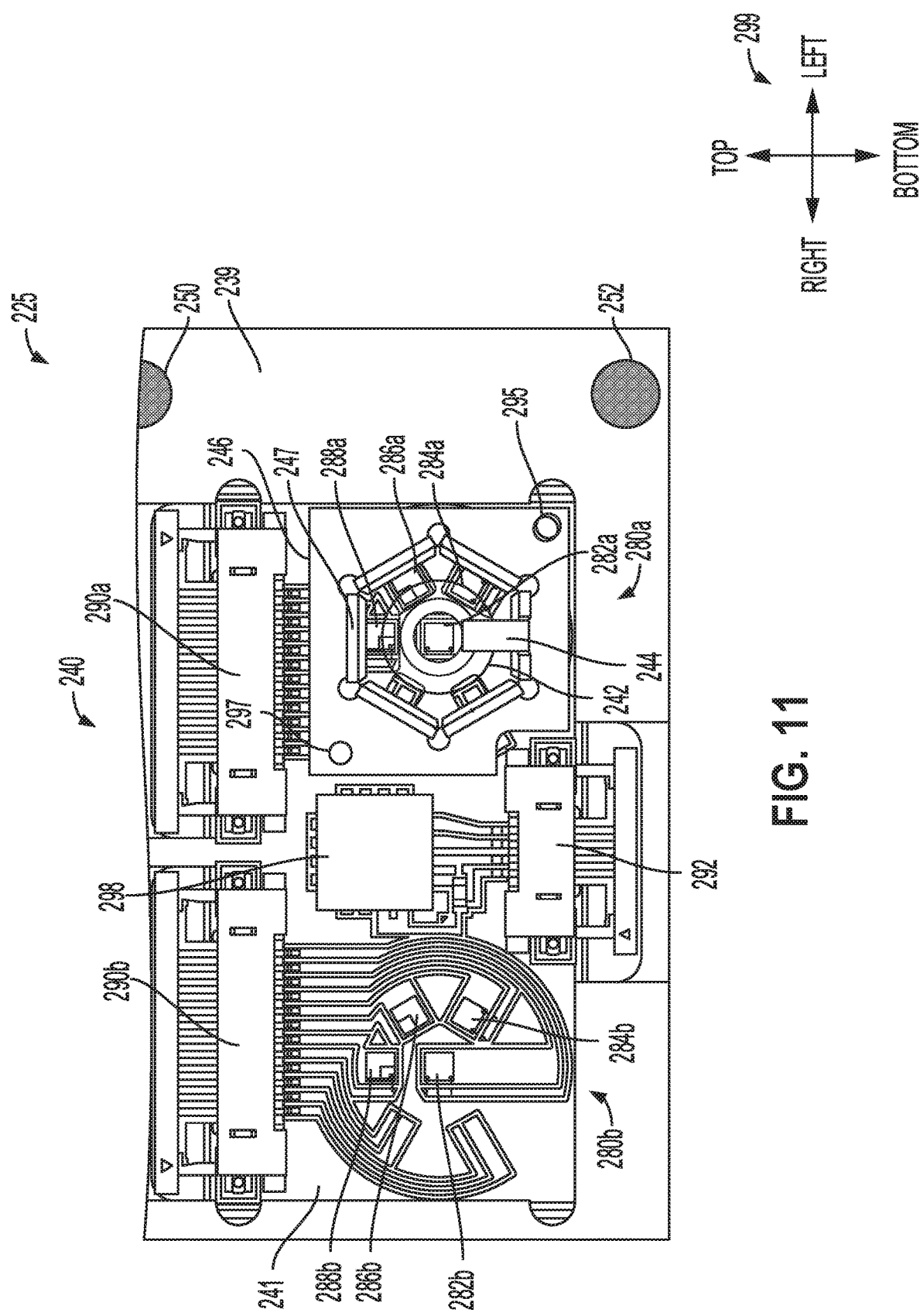
FIG. 11 shows a front view of the semi-conductor light matrix while included in the light engine.
Figure 15:
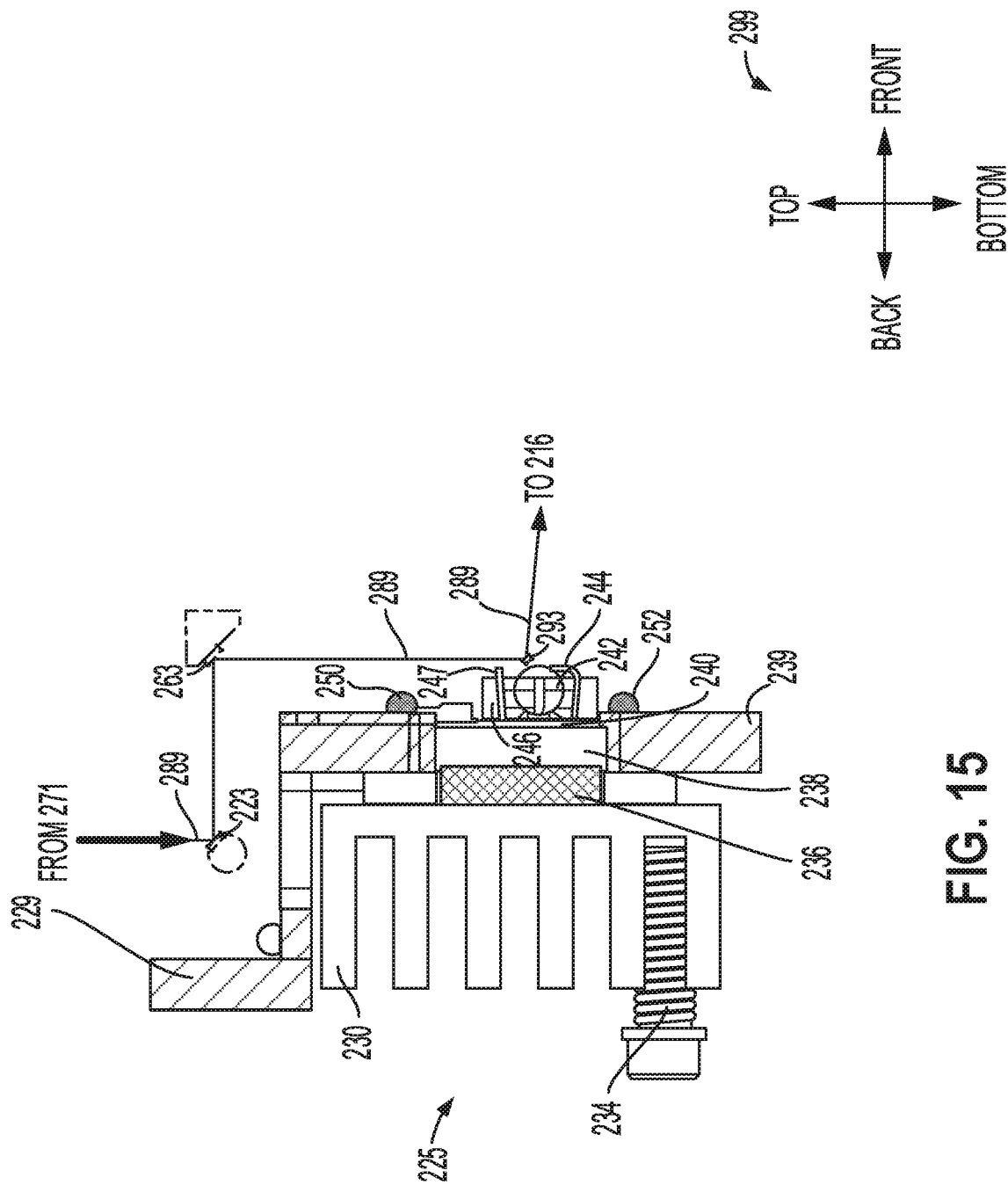
FIG. 15 shows a side section view illustrating optical paths from a second light source module that may be positioned vertically above the light engine.
Figure 16:
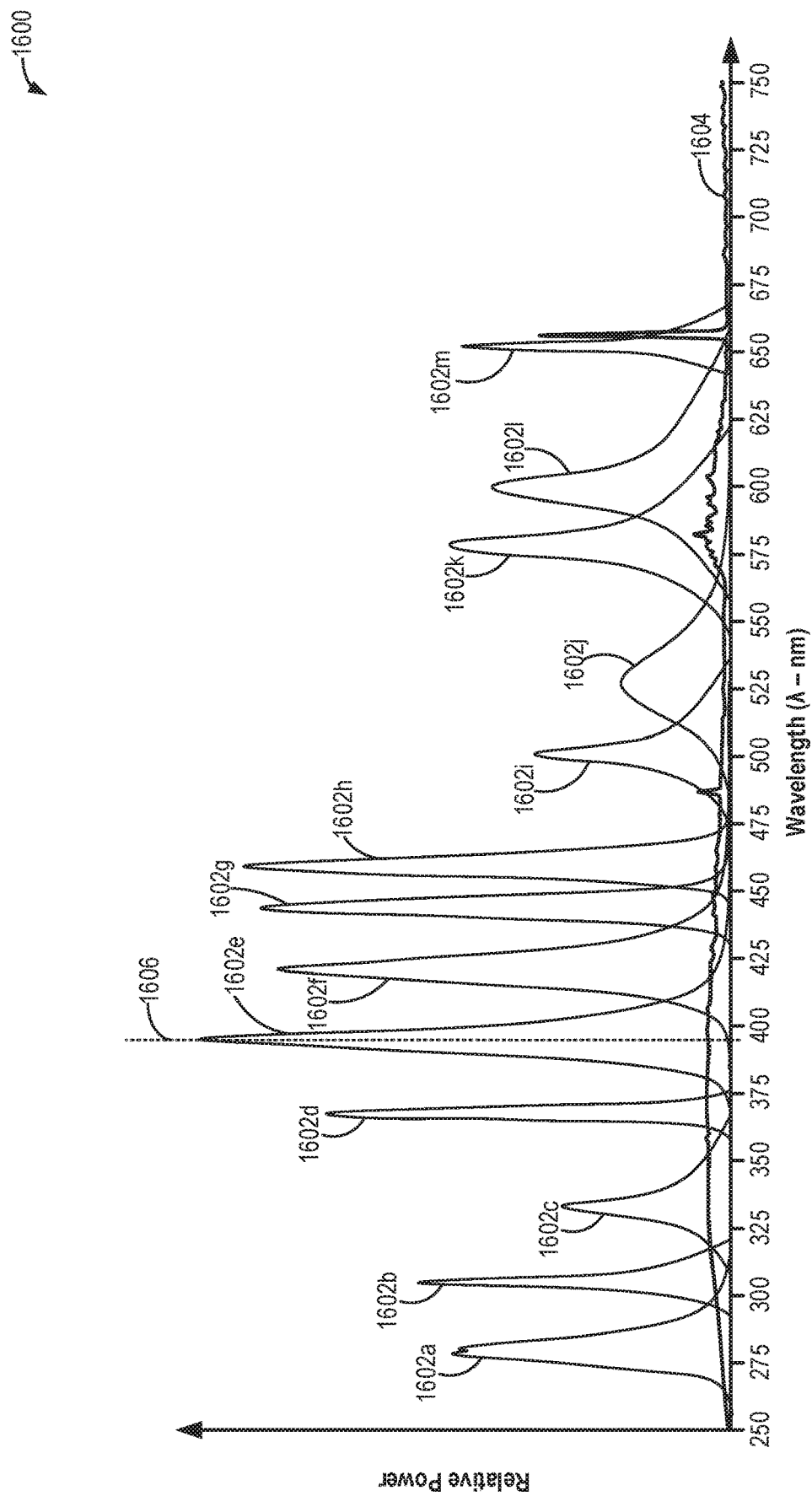
FIG. 16 shows example relative power spectra of the semi-conductor light matrix compared with a deuterium lamp.

The present description is related to a modular multi-wavelength UV-VIS detector unit. The modular multi-wavelength UV-VIS detector unit may be included in an HPLC system, such as the example HPLC system schematically shown in FIG. 1. Various views of components of the modular multi-wavelength UV-VIS detector unit are shown in FIGS. 2-14. In particular, FIGS. 2, 4, and 5 illustrate overviews of the modular multi-wavelength UV-VIS detector unit as a whole. FIG. 3 demonstrates how a flow cell may be inserted into a flow cell access drawer of the modular multi-wavelength UV-VIS detector unit while the drawer is open. FIGS. 6A-6B, 7A-7C, and 8A-8B illustrate a closing mechanism of the flow cell access drawer. FIGS. 9-11 particularly highlight an arrangement of light-emitting diodes and optical components that may be included in a first removable light source module of the modular multi-wavelength UV-VIS detector unit. FIGS. 12 and 13 illustrate how the light-emitting diodes and optical components align with components of the flow cell as the flow cell access drawer is closed, with the resulting optical paths illustrated in FIG. 14. FIG. 15 illustrates optical paths of light from a second removable light source module, positioned vertically above the first removable light source module. Furthermore, a graph comparing example relative power spectra of the light-emitting diodes with a deuterium lamp is illustrated in FIG. 16.

Figure 1:
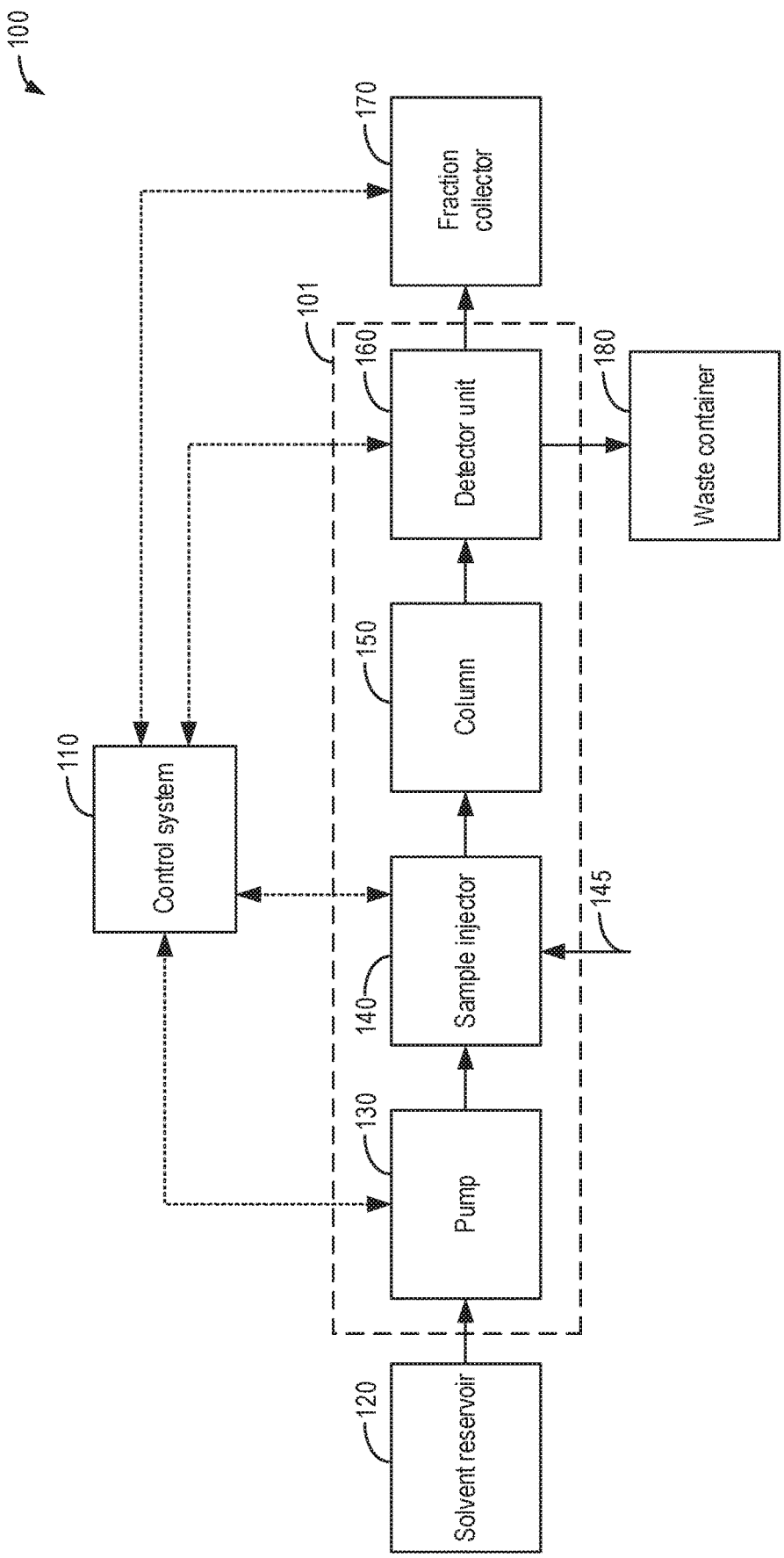
FIG. 1 shows a schematic depiction of a high-performance liquid chromatography (HPLC) system.

Referring to FIG. 1, a schematic diagram of an example HPLC system 100 is shown. HPLC system 100 may be operated to purify, detect, identify, or otherwise examine small molecule analytes. As such, HPLC system 100 may be configured as an analyzer. HPLC system 100 includes a control system 110, a solvent reservoir 120, a pump 130, a sample injector 140, a column 150, a detector unit 160, a fraction collector 170, and a waste container 180. Multiple components of the HPLC system 100 may be included in a common housing 101. As shown in FIG. 1, the pump 130, sample injector 140, column 150, and detector unit 160 are all housed within common housing 101. However, in other examples, more or fewer components may be housed in the common housing. For example, the solvent reservoir, fraction collector, and/or waste container may be housed in the common housing. Additionally or alternatively, the control system 110 may be housed in the common housing.

The control system 110 is communicatively coupled to other components of the HPLC system (as indicated by dashed lines), as described further below, in order to send and receive signals during system operation. Control system 110 may include a controller, such as a desktop or laptop computer, one or more user input devices (e.g., a mouse, keyboard, touch screen), a display system, and/or a communication system operable to couple the controller to one or more remote computing devices, for example. Control system 110 may receive input from an HPLC system operator to initiate a sample run. In other examples, the sample run may be automated or semi-automated, with control system 110 initiating the sample run according to one or more methods stored in a memory of the control system. The controller of the control system 110 may be an electronic controller and may include a memory storing instructions executable to carry out one or more methods. The controller may include one or more physical logic devices, such as one or more processors, configured to execute the instructions. Additionally or alternatively, the controller may include hardware or firmware configured to carry out hardware or firmware instructions. The memory may include removable and/or built-in devices, including optical memory, semiconductor memory, and/or magnetic memory. The memory may include volatile, nonvolatile, dynamic, static, read/write, read-only, random-access, sequential-access, location-addressable, file-addressable, and/or content-addressable devices. The memory and logic device(s) may be integrated together into one or more hardware-logic components, such as field-programmable gate arrays (FPGAs).

Prior to sample injection, HPLC system 100 may be primed with solvent. Control system 110 may activate pump 130, which draws solvent from solvent reservoir 120. Solvent reservoir 120 is fluidically connected to pump 130 as well as other components of HPLC system 100 downstream of pump 130, such as by lines (e.g., tubing). Solvent reservoir 120 may hold one or more solvents, such as hexanes, ethyl acetate, dicholormethane, and methanol, with the solvent(s) pumped by pump 130 input into control system 110 by the HPLC system operator or automatically selected based on a pre-programmed method stored in the memory of control system 110. In one example, one solvent, such as hexanes, may be used to prime HPLC system 100. In another example, two solvents at a selected ratio, such as 4:1 hexanes:ethyl acetate or 9:1 dichloromethane:methanol, may be used. Other suitable solvents may be selected to suit the application chemistry, chromatography method, column type, etc. In still another example, three or more solvents may be used. The solvent(s) and ratio used may be selected (e.g., by the HPLC operator or control system 110) based on the components to be purified, identified, or otherwise examined. Thus, as used herein, the term "solvent" also includes solvent mixtures. The term "solvent" also refers to the mobile phase eluate exiting the column without analyte.

Solvent pumped by pump 130 flows through sample injector 140 and into column 150. Column 150 may contain a solid phase adsorbent, such as silica gel, alumina, or other functionalized medium, selected based on the components to be purified, identified, or otherwise examined. The length and diameter of column 150 may also be selected based on the amount (e.g., mass or volume) of sample to be added to the column and may be installed by the HPLC system operator prior to activating the pump. After flowing through the column, the solvent flows through detector unit 160 for analysis, which may be a UV-VIS spectrophotometer (e.g., absorbance detector), as further described herein, although other types of detector units may additionally or alternatively be used, such as fluorescence detectors, photoionization detectors, charged aerosol detectors, electrical conductivity detectors, electrochemical detectors, mass spectrometers, refractive index detectors, etc. In the example of FIG. 1, detector unit 160 is a UV-VIS spectrophotometer. Detector unit 160 may measure a baseline absorbance value of the solvent. Control system 110 may subsequently subtract this baseline absorbance value from values measured after sample injection. After flowing through detector unit 160, the solvent is flowed to waste container 180.

Once HPLC system 100 is primed (e.g., the column is equilibrated with the appropriate solvent), a sample 145 may be injected into the flow path of solvent pumped by pump 130 via sample injector 140. In some examples, sample injector 140 may be an autosampler programmed to inject a sample according to a pre-determined method executed by control system 110. In another example, the HPLC operator may manually operate sample injector 140.

Once sample 145 is injected, it is loaded (e.g., adsorbed) onto the resin of column 150. Different components of sample 145 may have different affinities for the resin as well as the solvent flowing through the column. Thus, components with higher affinities for the resin will move through the column more slowly, while components with higher affinities for the solvent will move through the column more quickly. For example, if the resin is silica gel and the solvent has a low polarity (such as hexanes or a solvent mixture with a high ratio of hexanes), a more polar component will have stronger interactions with the silica gel and will be retained on the column for a longer duration, and a more nonpolar component will have stronger interactions with the solvent and will be eluted from the column after a shorter duration. Further, the solvent(s) used may be adjusted throughout the sample run, such as by increasing the polarity of the solvent mixture, in what is known as a gradient elution. In other examples, the composition of the solvent may remain constant throughout the sample run in what is known as isocratic elution. Other elution methods may also be used, such stepwise elution or combination elution methods.

After each component of sample 145 is eluted from column 150, it passes through detector unit 160. Detector unit 160 exposes the component to one or more wavelengths of light, as further described herein. As light from a light source of detector unit 160 passes through the component, which is diluted in the solvent, some or all of the light may be absorbed, with the amount of light transmitted through the component measured by detector unit 160. Control system 110 may generate an absorbance profile of the component from data received from detector unit 160. From detector unit 160, each component may flow to fraction collector 170. Fraction collector 170 may fill collection containers, such as vials or test tubes, with eluted components. The containers may be filled to a set volume, with the fraction collector advancing to the next container when the set volume is reached. In another example, the fraction collector may advance to the next container based on the absorbance profile of the component that has passed through the detector. If the absorbance profile changes, control system 110 may trigger fraction collector 170 to advance to the next container, as a change in absorbance profile may indicate a different component. Thus, two components may be kept separate. Filled containers may be referred to as fractions.

Control system 110 may generate a chromatogram with absorbance (as measured by detector unit 160) as the vertical axis (e.g., Y-axis) plotted against retention time (the time it takes a component to pass through HPLC system 100) and/or fraction number as the horizontal axis (e.g., X-axis). The chromatogram may contain distinct peaks in absorbance corresponding to each analyte (e.g., component) that has passed through the system. Optimally, the absorbance signal is proportional to the concentration of analyte, and the peaks for each analyte are separated. The HPLC system operator may identify fractions containing a component of interest based on the chromatogram and/or absorbance profiles. Therefore, the ability to identify fractions containing the component of interest may depend on the accuracy and sensitivity of the detector.

Next, FIGS. 2-15 show example configurations with relative positioning of various components of a modular multi-wavelength UV-VIS detector unit 200 (e.g., an absorbance detector instrument module). In some examples, UV-VIS detector unit 200 may be included in an HPLC system. UV-VIS detector unit 200 may be detector unit 160 of FIG. 1, for example. Like components shown in FIGS. 2-15 are numbered the same and may not be reintroduced. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Reference axes 299 are included where relevant to further demonstrate the relative positioning of the components and views (e.g., top, bottom, left, right, back, and front), and thus, component surfaces, movements, etc. will be described according to the labeled directions of reference axes 299. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning first to FIG. 2, a left isometric view of modular multi-wavelength UV-VIS detector unit 200 is shown. Modular multi-wavelength UV-VIS detector unit 200 is shown encased by a housing, the housing including a right wall 201, a cover 202 (which includes a top surface and a left wall), and a bottom surface 205. Modular multi-wavelength UV-VIS detector unit 200 further includes a front panel 208 and a back surface (not visible in FIG. 2). As shown in FIG. 2, cover 202 includes vent holes 206 to facilitate airflow through modular multi-wavelength UV-VIS detector unit 200. Further, cover 202 includes an access panel 204. Access panel 204 may be fixed to cover 202 via screws, for example. Access panel 204 may be removed to access internal components of modular multi-wavelength UV-VIS detector unit 200 without removing cover 202, for example. In particular, removing access panel 204 may allow access to one or more light source modules of modular multi-wavelength UV-VIS detector unit 200, as will be further described below.

A conductivity detector 213 and a display 219 are shown coupled to front panel 208. For example, conductivity detector 213 may measure a conductivity of a sample before it flows through a flow cell assembly 214. Although not illustrated herein, conductivity detector 213 and flow cell assembly 214 may be connected by tubing so that the sample flows from a column of the HPLC system (e.g., column 150 of FIG. 1) to conductivity detector 213 and from conductivity detector 213 to flow cell assembly 214. After passing through flow cell assembly 214, the sample may flow to a fraction collector (e.g., fraction collector 170 of FIG. 1) or to a waste container (e.g., waste container 180 of FIG. 1). Display 219 may show absorbance, transmittance, or conductivity readings of the sample as it passes through conductivity detector 213, for example.

Flow cell assembly 214 is configured to receive a sample (e.g., a fluid) and provides a sample interrogation region for taking an absorbance measurement of the sample. For example, light emitted by a light source of modular multi-wavelength UV-VIS detector unit 200 may travel along a light path through flow cell assembly 214, where it may be at least partially absorbed by the sample before traveling to a detector, as will be further described herein with particular reference to FIG. 14. Flow cell assembly 214 is shown inserted within a flow cell access drawer 212. Flow cell access drawer 212 may be in an open position, as shown in FIG. 2, or a closed position, as will be shown in FIGS. 5, 6B, 7C, and 8B. Furthermore, a back surface of flow cell access drawer 212 may include a transparent window or aperture to enable light to enter flow cell assembly 214 while flow cell assembly is inserted in flow cell access drawer 212, for example.

During operation of modular multi-wavelength UV-VIS detector unit 200 (e.g., while a sample interrogation is performed), flow cell access drawer 212 may be kept in the closed position so that optics are aligned and a distance between flow cell assembly 214 and the optics is smaller, as will be further described herein. An opening 210 formed by front panel 208 and a flow cell access drawer body 217 enable flow cell access drawer 212 to slide backward into front panel 208 so that flow cell assembly 214 is at least partially surrounded by front panel 208 when flow cell access drawer 212 is in the closed position, as will be shown in FIGS. 5, 6B, 7C, and 8B. For example, flow cell access drawer body 217 (and correspondingly, opening 210) is shaped to receive flow cell access drawer 212 and flow cell assembly 214. Thus, flow cell access drawer 212 may comprise a sliding assembly configured to slidingly move between the open position and the closed position, thereby slidingly moving flow cell assembly 214 between the open position and the closed position. While the disclosure herein describes a flow cell access drawer, other sliding element configurations are possible, such as a sliding shelf, a sliding rack, or other configurations that slidingly move a position of the flow cell assembly relative to the optics, as will be further described below.

Turning to FIG. 3, a left isometric view of front panel 208 is illustrated. While flow cell access drawer 212 is in the open position, as shown in FIG. 3, flow cell assembly 214 may be removed or inserted. Flow cell assembly 214 is shown outside of flow cell access drawer 212 in FIG. 3 and may be inserted into flow cell access drawer 212 in the direction of the arrow. Flow cell assembly 214 may include a capillary (not shown in FIG. 3) through which light is configured to pass during sample interrogation. The capillary may include optically transparent windows on either side (such as window 211) to facilitate the passage of light through the capillary and to one or more detectors (described in more detail below). In this way, by including a moveable flow cell access drawer, modular multi-wavelength UV-VIS detector unit 200 may be configured with a shortened optical path (e.g., when flow cell access drawer 212 is in the closed position) while a user may still access flow cell assembly 214 (e.g., when flow cell access drawer 212 is in the open position) without disassembly of modular multi-wavelength UV-VIS detector unit 200.

Next, FIG. 4 shows a left isometric view of modular multi-wavelength UV-VIS detector unit 200 with cover 202 removed, revealing internal components of the detector unit. As will be further described herein with respect to FIGS. 8A and 8B, flow cell access drawer 212 is attached to a sliding wall 203 that is located within the housing of modular multi-wavelength UV-VIS detector unit 200. For example, sliding wall 203 may move translationally (e.g., horizontally) relative to right wall 201, such as by sliding toward the back of modular multi-wavelength UV-VIS detector unit 200 when flow cell access drawer 212 is closed or by sliding toward the front of the detector unit when flow cell access drawer 212 is opened. As such, right wall 201 may be a fixed surface with respect to bottom surface 205 and front panel 208, for example, while sliding wall 203 is a movable surface. For example, along with flow cell access drawer 212, sliding wall 203 may further comprise the sliding assembly and is slidingly movable between the open position and the closed position.

A light source module 220 is shown in the bottom front portion of modular multi-wavelength UV-VIS detector unit 200. Light source module 220 may include a housing 221 supporting a light engine that includes a semi-conductor light matrix, such as an array of light-emitting diodes (LEDs), as will be illustrated with respect to FIG. 9, for providing light for sample absorbance measurements. A first fan 222 is positioned behind light source module 220 in order to cool components of the light source module. A second fan 224 is shown positioned above first fan 222. In some examples, second fan 224 may cool a second light source module 271 that may be optionally included in UV-VIS detector unit 200. The second light source module 271, an outline of which is shown in dashed lines in FIG. 4, may comprise LEDs, lasers, or a lamp to produce light and may be positioned vertically above light source module 220 and horizontally in front of second fan 224. As an example, light output by the second light source module 271 may be directed toward flow cell assembly 414 by one or more mirrors, as will be further described below with respect to FIGS. 14 and 15. Furthermore, as shown in FIG. 4, electric circuits 265 may be included in a back portion of modular multi-wavelength UV-VIS detector unit 200. The electric circuits 265 may include electronics to drive and/or control the light emitters, signal detector(s), fans, thermal elements, and/or other components of UV-VIS detector unit 200. The electric circuits 265 may further include a memory and processing unit to receive absorbance information from the signal detector(s) and process the absorbance information (e.g., for display and/or to send the absorbance information to a separate processor, such as control system 110 of FIG. 1, or display unit).

FIG. 5 shows a left side view of modular multi-wavelength UV-VIS detector unit 200 with cover 202 removed. In the example of FIG. 5, flow cell access drawer 212 is closed, and flow cell assembly 214 is located at least partially within opening 210 so that flow cell assembly 214 is obscured by front panel 208 (in the view of FIG. 5). A housing of light source module 220 is removably fixed to right wall 201 via a first fastener 235 and a second fastener 237. First fastener 235 and second fastener 237 may be any combination of screws, bolts, and pins, for example. As such, light source module 220 may stay fixed in place within modular multi-wavelength UV-VIS detector unit 200.

Light source module 220 houses a light engine 225. The housing 221 of light source module 220 may include an opening on a front side through which components of light engine 225 may extend. Light engine 225 may include one or more light emitters configured to emit interrogating light to the sample in the flow cell assembly 214, as described in more detail below, as well as thermal components and a spring-loaded mechanism coupling the light engine to the light source module.

As described above, light source module 220 may be fixedly coupled to the detector unit housing. However, light engine 225 included in light source module 220 may move translationally relative to the housing 221 of light source module when flow cell access drawer 212 is pulled open or pushed closed, as will be described with respect to FIGS. 7A-7C. Light engine 225 may include a floating rig to which the one or more light emitters are coupled to allow horizontal and/or vertical movement of the one or more light emitters during closing of the flow cell access drawer, thereby facilitating alignment of the one or more light emitters with the capillary of the flow cell and the signal detector. For example, the light engine 225 may be coupled to light source module housing 221 via a compliant structure, such as a spring-loaded mechanism. The spring-loaded mechanism includes a first spring 226 and a second spring 228 that may apply a horizontal force to a first arm 227 and a second arm 229 of light engine 225, respectively. The horizontal force may move first arm 227 and second arm 229 forward (e.g., toward the front of modular multi-wavelength UV-VIS detector unit 200) until first arm 227 rests against a first seat 231 and second arm 229 rests against a second seat 233 when flow cell access drawer 212 is opened. As shown in FIG. 5, with flow cell access drawer 212 in the closed position, first arm 227 and second arm 229 are lifted from first seat 231 and second seat 233, respectively (e.g., a gap is visible between first arm 227 and first seat 231 and between second arm 229 and second seat 233). Thereby, components of light engine 225, including first arm 227, second arm 229, a semi-conductor light matrix (not visible in FIG. 5), a heat sink 230, and two heat sink clamp springs 232 and 234 may translationally shift inside of light source module 220 when flow cell access drawer 212 is opened or closed, as further described below. As such, light engine 225 is spring loaded but floating when flow cell access drawer 212 is in the closed position, facilitating alignment of the optics and one or more light emitters of light engine 225 with flow cell assembly 214 when flow cell access drawer 212 is in the closed position. Further, opening or closing flow cell access drawer 212 moves flow cell assembly 214 relative to the one or more light emitters of light engine 225.

Figure 6A:
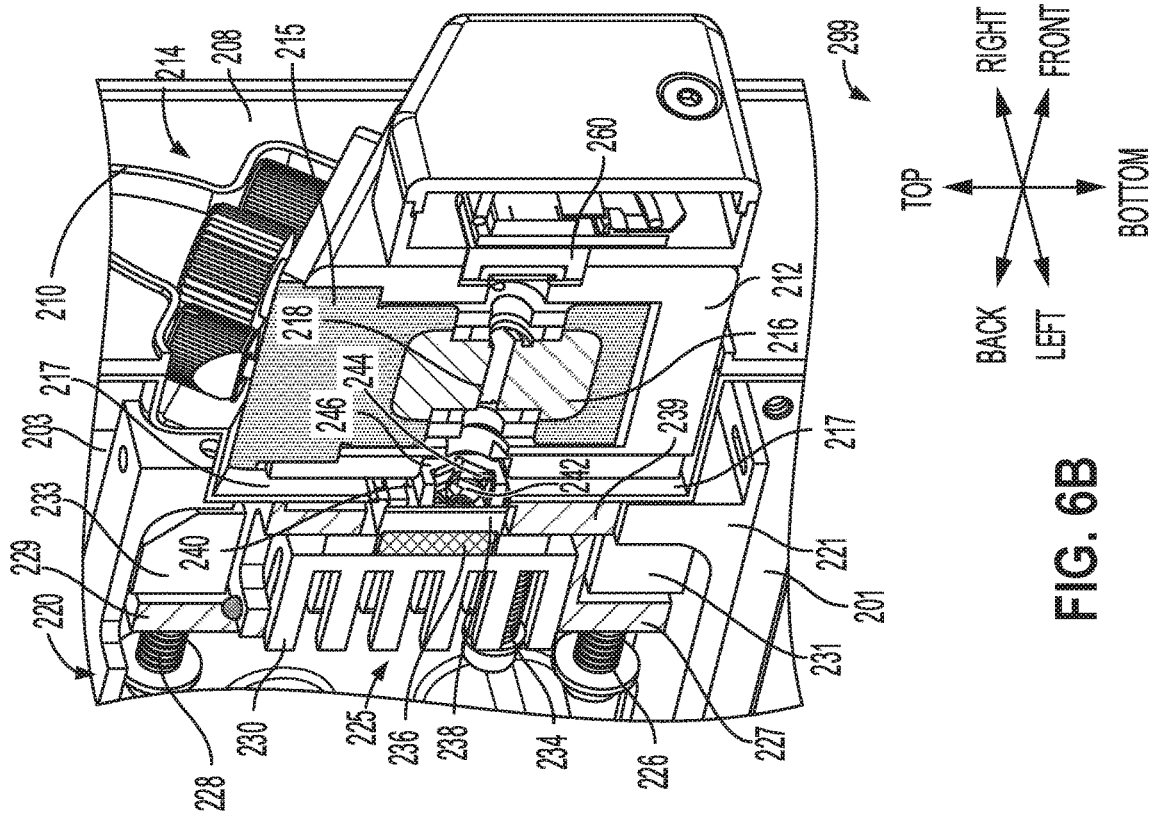
FIG. 6A shows a left isometric section view of the modular multi-wavelength UV-VIS detector unit with the flow cell access drawer in an open position.
Figure 6B:
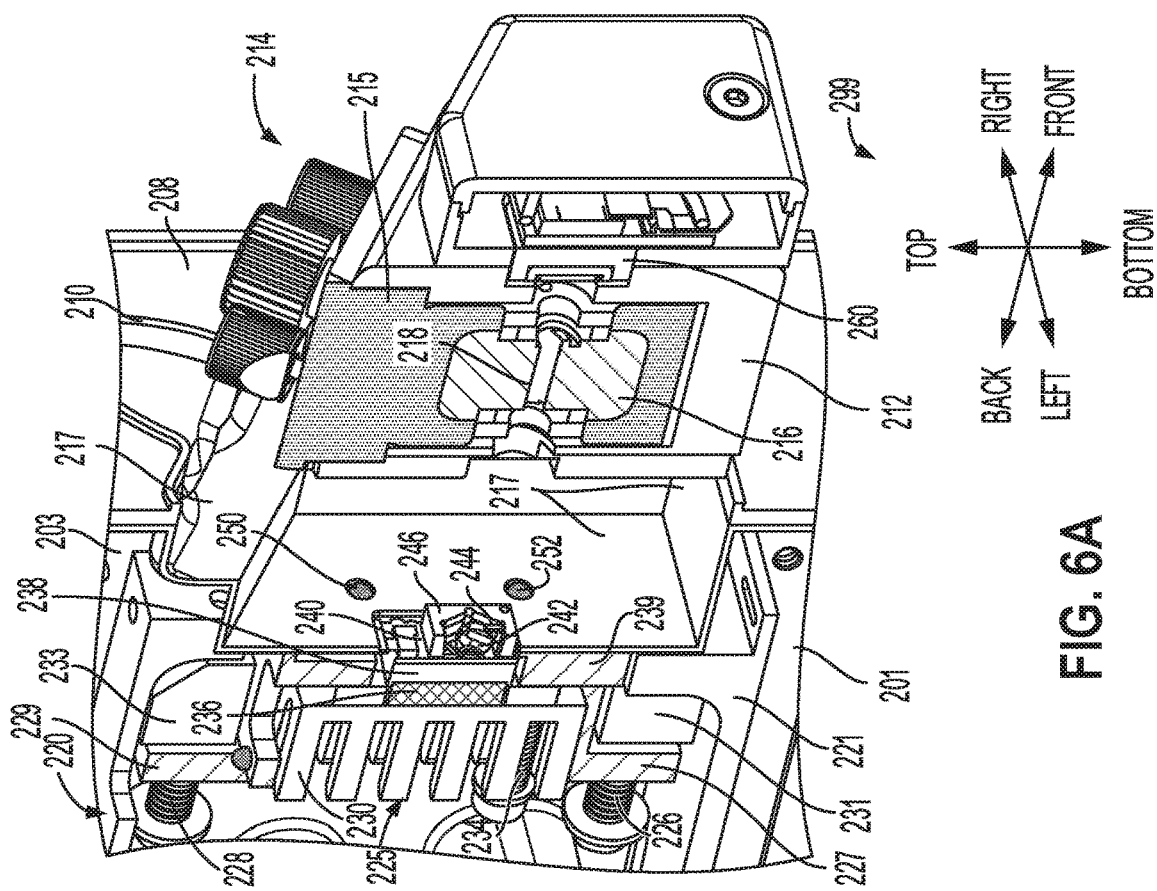
FIG. 6B shows a left isometric section view of the modular multi-wavelength UV-VIS detector unit with the flow cell access drawer in a closed position.

Next, FIGS. 6A and 6B show a left isometric section view highlighting the relative arrangement of components of light engine 225 and flow cell access drawer 212 while the flow cell access drawer is open (FIG. 6A) and closed (FIG. 6B). The section view shows a flow cell 216 within flow cell assembly 214, the flow cell surrounded by a housing 215. A capillary 218 within flow cell 216 provides the sample interrogation region within flow cell 216. For example, as the sample flows through capillary 218, the sample may be exposed to light from a semi-conductor light matrix (SLM) 240 included in light engine 225. As such, capillary 218 is configured to receive and pass light as well as flow sample. Flow cell 216 may be comprised of metals, polymers, ceramics, quartz, and/or glass, etc. Flow cell 216 may include one or more lenses, transparent windows, and/or apertures that allow light to enter and exit the flow cell, respectively. After exiting the flow cell, the light may reach a signal detector 260 shown included within flow cell access drawer 212 in front of flow cell 216 and vertically arranged to be aligned with capillary 218. Signal detector 260 may be a variable-wavelength detector or a diode array, for example. Signal detector 260 may output a signal (e.g., in volts or amps) that is relative to an optical power or intensity (I) of light transmitted through capillary 218 and the sample within. For example, as the intensity of light transmitted through capillary 218 increases, the voltage output of signal detector 260 increases. The signal output by signal detector 260 may be received by a control system (e.g., control system 110 shown in FIG. 1), which may store data from signal detector 260 and perform various data processing actions, for example, to determine an absorbance measurement and/or the concentration of the sample in capillary 218.

Coupled to flow cell access drawer 212, signal detector 260 may be included in the sliding assembly. The spring-loaded but floating light engine 225 further facilitates alignment of the one or more light emitters of SLM 240 with capillary 218 of flow cell 216 and signal detector 260 when flow cell access drawer 212 is in the closed position so that light emitted by the one or more light emitters of SLM 240 efficiently passes through capillary 218 (and the sample therein) en route to signal detector 260, as will be further described below with respect to FIG. 14.

Light emitted by SLM 240 may pass through one or more optical components (e.g., optics) of light engine 225 before passing through capillary 218. In the examples of FIGS. 6A and 6B, light engine 225 is shown including a spherical lens 242 and a reflector 246. In some examples, such as shown in FIGS. 6A and 6B, spherical lens 242 may be coupled to SLM 240 via a retaining tab 244 (also referred to herein as a mounting arm 244). Further, in some examples, retaining tab 244 may include a mirror to direct light from a second light source through capillary 218. Reflector 246 may be a radial reflector, for example, that at least partially surrounds spherical lens 242.

SLM 240 is shown coupled to a thermal module 236 via a heat spreader 238. For example, thermal module 236 may be a Peltier module. A back surface of thermal module 236 is coupled to heat sink 230. Together, heat sink 230, thermal module 236, and heat spreader 238 may be used by the control system to thermally regulate SLM 240, as an amount of light output by light emitters (e.g., LEDs) of SLM 240 may vary with temperature.

Housing 221 of light source module 220 may include an opening through which components of light engine 225 extend. Specifically, housing 221 is coupled to the spring-loaded mechanism of light engine 225 via a front wall 239 of the spring-loaded mechanism (front wall 239 is coupled to each of arm 227 and arm 229). Front wall 239 includes an opening to accommodate SLM 240 and heat spreader 238. Likewise, flow cell access drawer body 217 (referred to herein as drawer body 217 for brevity) includes an opening through which SLM 240 and associated optics extend. Drawer body 217 may be shaped to match the angles/contours of flow cell access drawer 212 such that drawer body 217 partially surrounds flow cell access drawer 212 when the drawer is in the closed position.

A plurality of kinematic locators optically align light engine 225 with flow cell access drawer 212 during closing of the drawer. FIG. 6A illustrates two kinematic locators 250 and 252. For example, kinematic locators 250 and 252 may be locating balls that align with corresponding grooves in flow cell access drawer 212 for vertical and horizontal translational plane alignment to ensure that light from SLM 240 is transmitted through capillary 218, as further described herein. As shown in FIG. 6A, kinematic locators 250 and 252 are coupled to front wall 239 and protrude through openings within drawer body 217 when flow cell access drawer 212 is in the open position. The kinematic locators, coupled between front wall 239 and drawer body 217, may be compliant members included in the compliant structure of light engine 225.

As illustrated by comparing FIGS. 6A and 6B, there is a greater distance between SLM 240 and flow cell access drawer 212 when flow cell access drawer 212 is in the open position (e.g., FIG. 6A) compared with the closed position (e.g., FIG. 6B). As shown in FIG. 6B, when flow cell access drawer is in the closed position, flow cell access drawer substantially fills drawer body 217, and kinematic locators 250 and 252 are no longer visible.

Figure 7A:
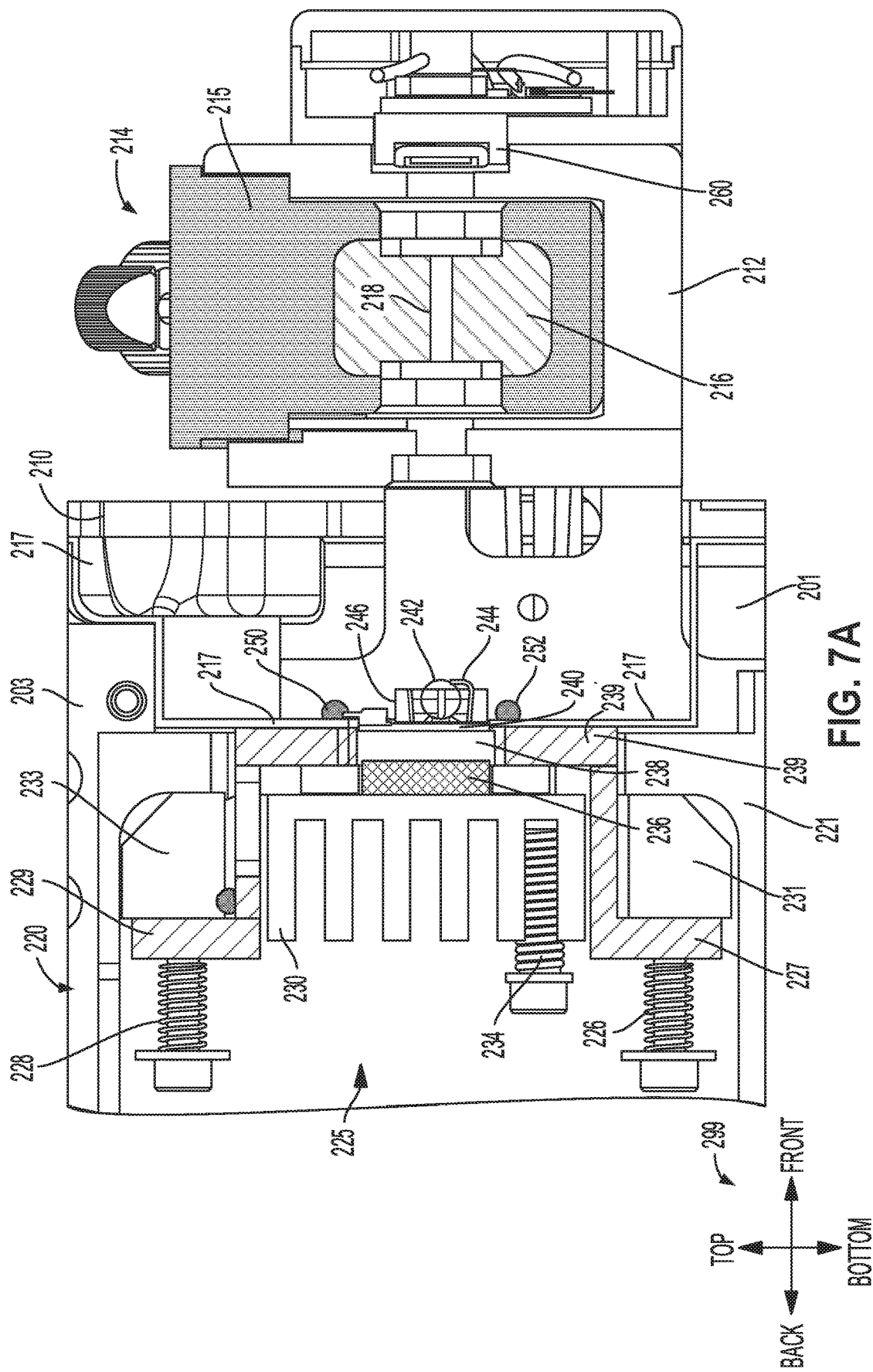
FIG. 7A shows a left side section view of the modular multi-wavelength UV-VIS detector unit with the flow cell access drawer in the open position.
Figure 7B:
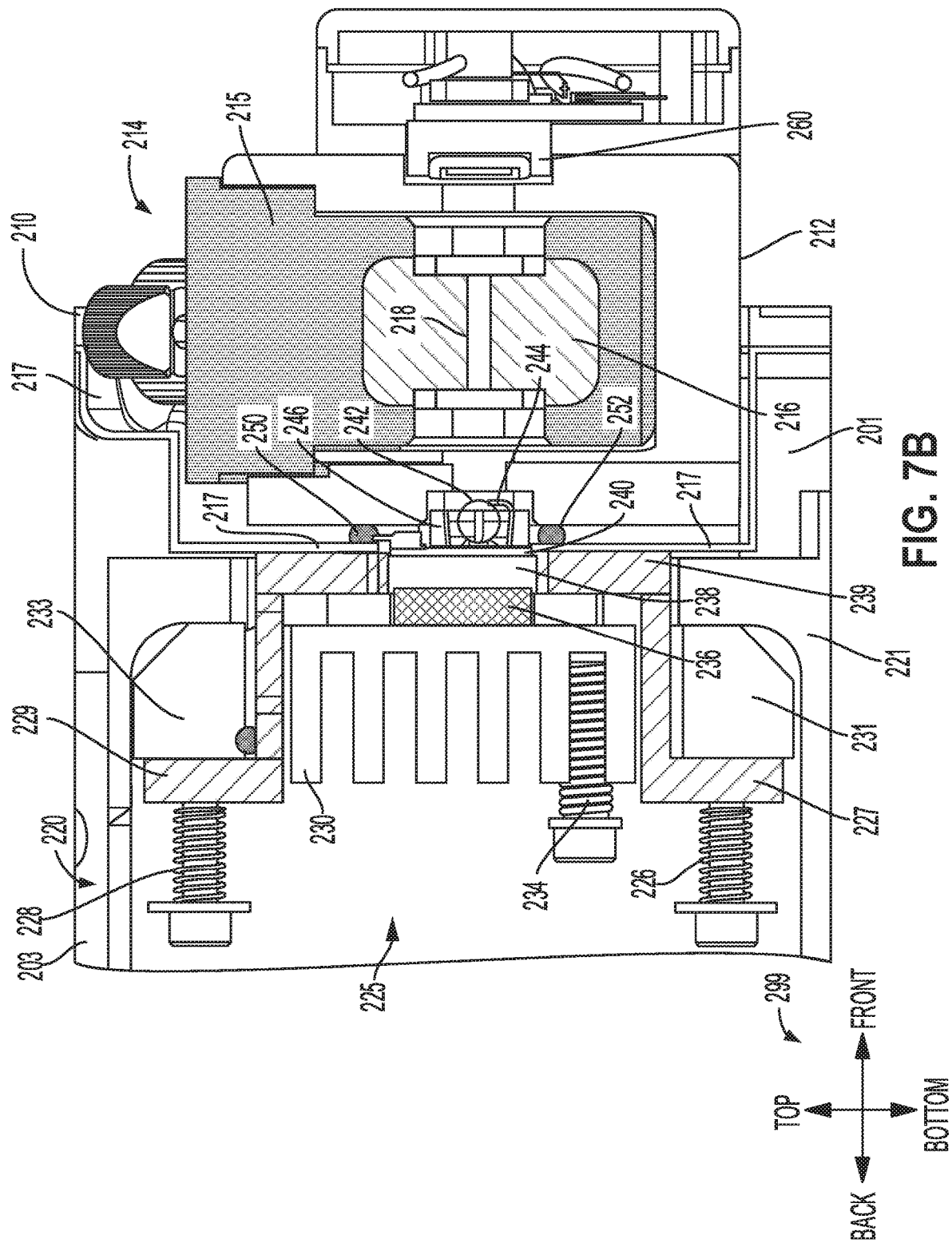
FIG. 7B shows a left side section view of the modular wavelength UV-VIS detector unit during closing of the flow cell access drawer.
Figure 7C:
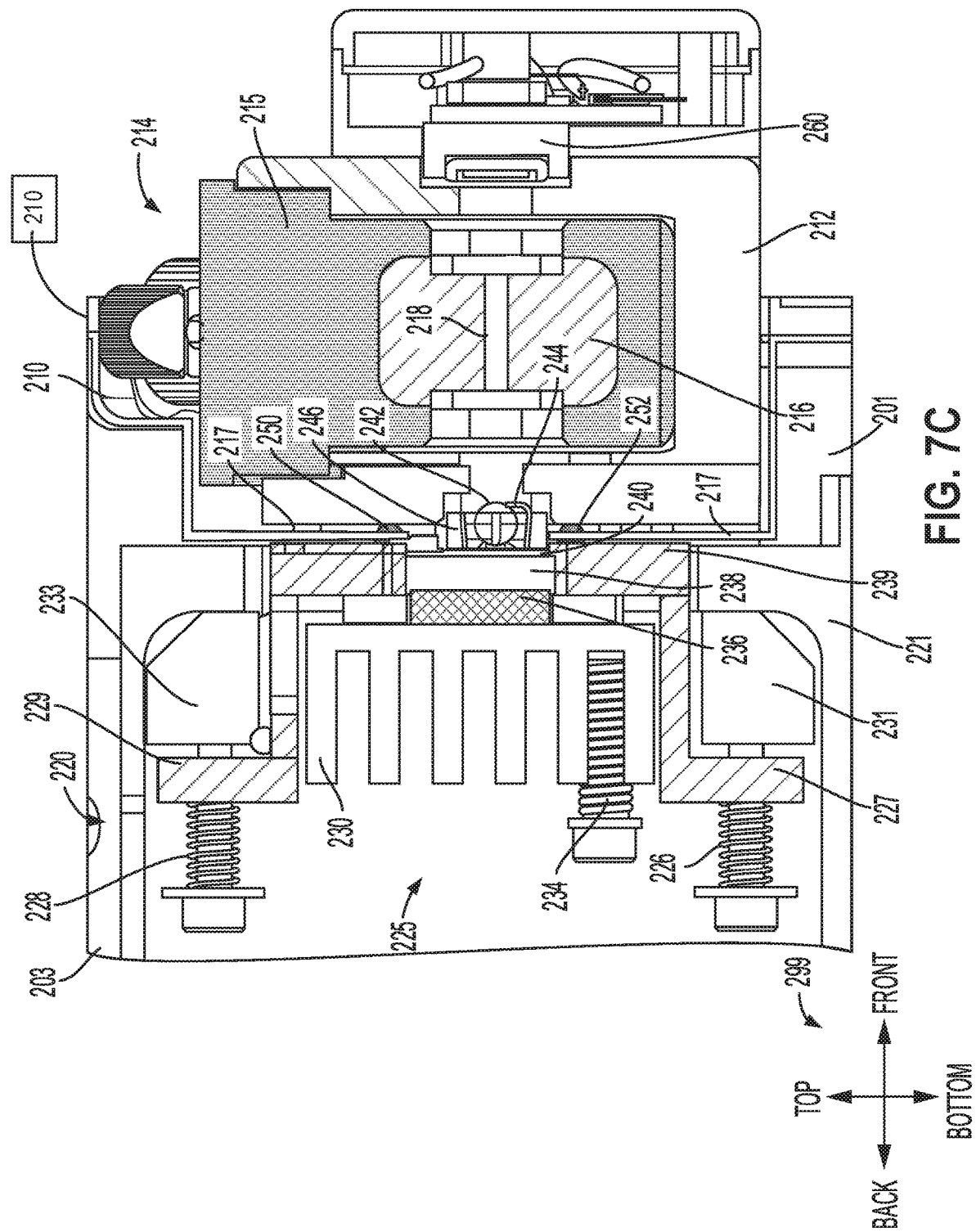
FIG. 7C shows a left side section view of the modular multi-wavelength UV-VIS detector unit with the flow cell access drawer in the closed position.

FIGS. 7A-7C show a left side section view highlighting the relative arrangement of components of light engine 225 and flow cell access drawer 212 while the flow cell access drawer is open (FIG. 7A), during closing (FIG. 7B), and while the flow cell access drawer is closed (FIG. 7C). In particular, FIGS. 7A-7C illustrate the spring loaded mechanism of light engine 225 as kinematic locators 250 and 252 make contact with flow cell access drawer 212. For example, when flow cell access drawer 212 is in the open position illustrated in FIG. 7A, sliding wall 203 is shifted fully forward (e.g., toward the front of modular multi-wavelength UV-VIS detector unit 200) and in contact with a back surface of drawer body 217. First arm 227 and second arm 229 are in face-sharing contact with first seat 231 and second seat 233, respectively, such as due to a horizontal force applied by first spring 226 and second spring 228. As shown, first seat 231 and second seat 233 may be directly coupled, such as bonded, to the housing 221 of light source module 220. Furthermore, with first arm 227 and second arm 229 pressed against first seat 231 and second seat 233, front wall 239 of light engine 225 is in face-sharing contact with drawer body 217. With front wall 239 of light engine 225 in contact with drawer body 217, kinematic locators 250 and 252 are maximally protruded within a cavity formed by drawer body 217.

FIG. 7B illustrates a back surface of flow cell access drawer 212 making initial contact with kinematic locators 250 and 252 during a closing operation. Compared with FIG. 7A, in FIG. 7B, flow cell access drawer 212 is translationally shifted backward. Furthermore, sliding wall 203 is translationally shifted toward the back of modular multi-wavelength UV-VIS detector unit 200 such that sliding wall 203 no longer contacts drawer body 217. With initial contact made between the back surface of flow cell access drawer 212 and kinematic locators 250 and 252, first arm 227 remains pressed against (e.g., in face-sharing contact with) first seat 231 by first spring 226, and second arm 229 remains pressed against second seat 233 by second spring 228.

FIG. 7C shows flow cell access drawer 212 in the fully closed position, with light engine 225 pressed backward by flow cell access drawer 212. For example, first arm 227 is lifted from first seat 231, second arm 229 is lifted from second seat 233, and front wall 239 of light engine 225 is no longer in contact with drawer body 217. First arm 227 is configured to translate along a first shaft coupled to first seat 231, and spring 226 is wound around the first shaft and is configured to apply a spring force to the first arm and bias the light engine toward the flow cell access drawer. For example, first arm 227 may include an opening through which the first shaft extends, which enables movement of first arm 227 horizontally along the shaft. The opening may be sized to allow a small amount of vertical movement of first arm 227 relative to the shaft as well, thus providing a "floating" configuration of light engine 225. Likewise, second arm 229 is configured to translate along a second shaft coupled to second seat 233, and spring 228 is wound around the second shaft and is configured to apply a spring force to the second arm and bias the light engine toward the flow cell access drawer. Second arm 229 may include an opening through which the second shaft extends, which enables movement of second arm 229 horizontally along the shaft. The opening may be sized to allow a small amount of vertical movement of second arm 229 relative to the shaft.

Figure 8A:
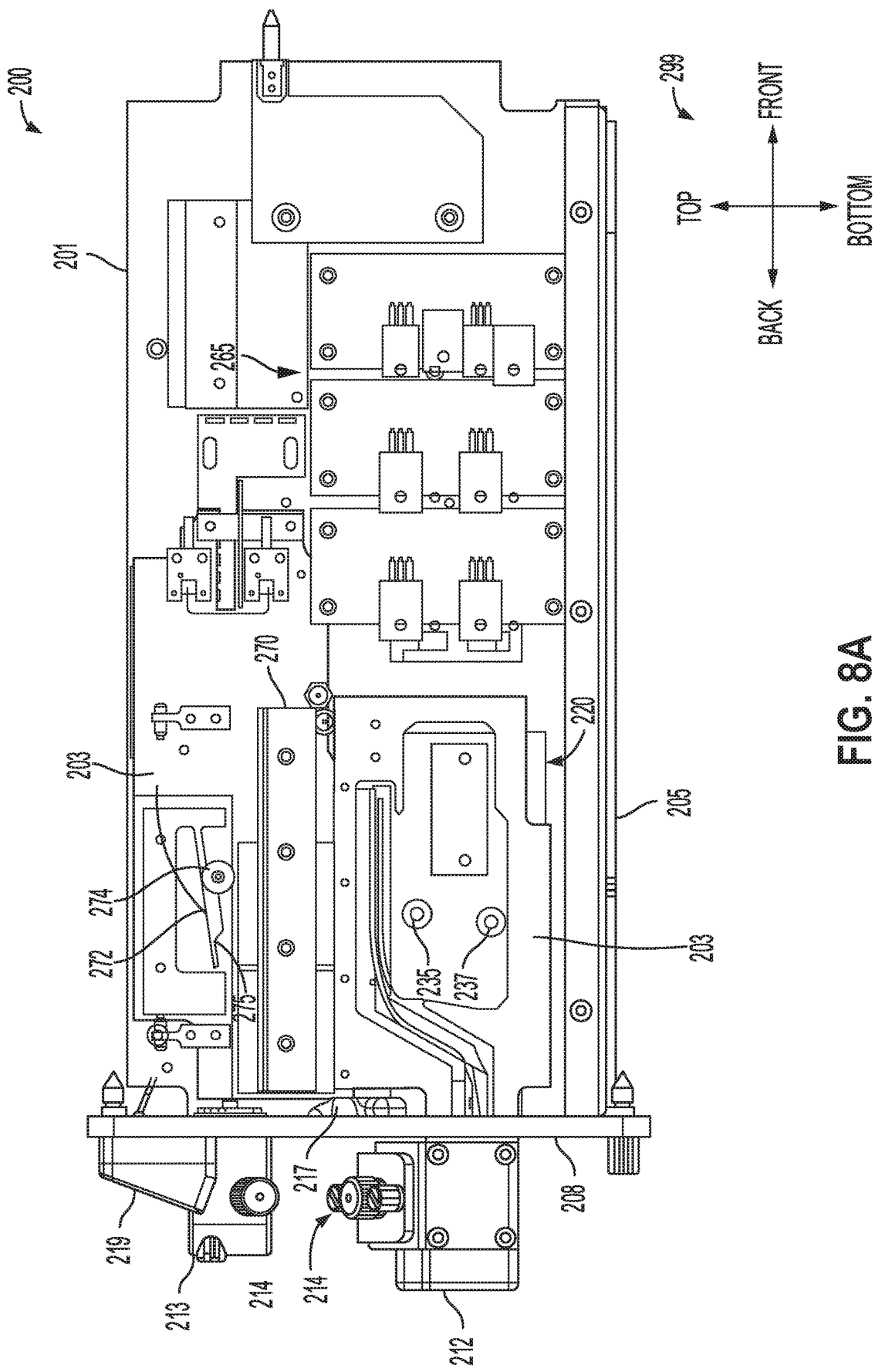
FIG. 8A shows a right side view of the modular multi-wavelength UV-VIS detector unit with the flow cell access drawer in the open position.
Figure 8B:
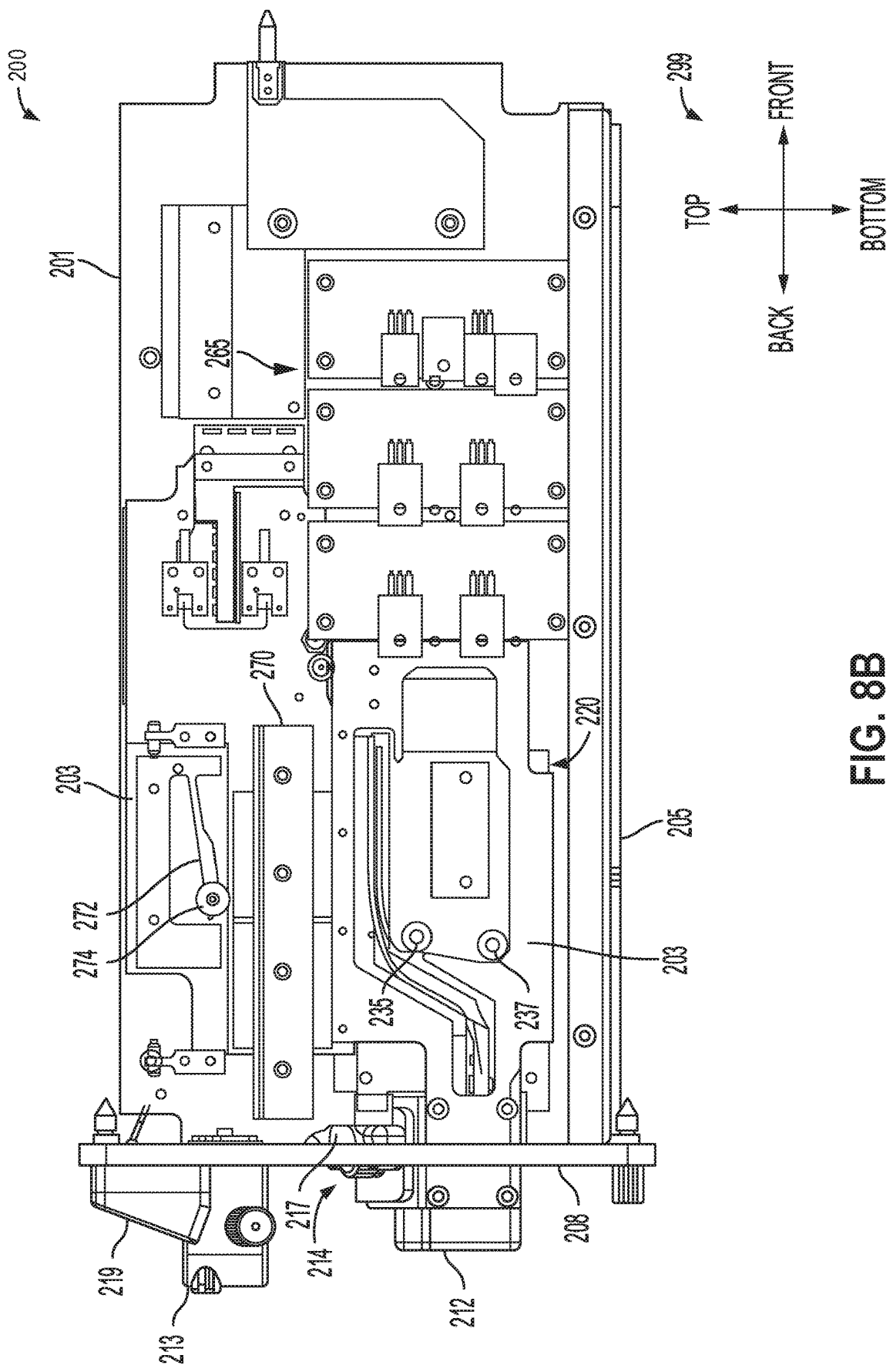
FIG. 8B shows a right side view of the modular multi-wavelength UV-VIS detector unit with the flow cell access drawer in the closed position.

To further illustrate the closing mechanism, FIGS. 8A and 8B show a right side view of modular multi-wavelength UV-VIS detector 200 in the open position (FIG. 8A) and the closed position (FIG. 8B). Sliding wall 203 may move horizontally along a guide rail (e.g., carriage) 270 from front to back (when flow cell access drawer 212 is pushed closed) or back to front (when flow cell access drawer 212 is pulled open), as indicated by reference axes 299. For example, an operator of modular multi-wavelength UV-VIS detector unit 200 may apply a horizontal force to flow cell access drawer 212 when flow cell access drawer 212 is in the open position (such as illustrated in FIG. 8A) to slide wall 203 backward along guide rail 270 until flow cell access drawer 212 (and sliding wall 203) reaches a backmost position. For example, example, bearings on guide rail 270 may serve as hard stops to define a travel range of sliding wall 203. As flow cell access drawer 212 is pushed backward toward the closed position, a leaf spring 272 coupled to sliding wall 203 slides against a roller 274 coupled to right wall 201 (shown transparent in FIGS. 8A and 8B for visualization). For example, roller 274 may be horizontally and vertically fixed in place, and leaf spring 272 is shown curving to a detent 275. As sliding wall 203 moves backward along guide rail 270, the detent 275 of leaf spring 272 catches against roller 274, as shown in FIG. 8B, preventing sliding wall 203 (and flow cell access drawer 212) from moving forward. Other mechanisms for holding the flow cell access drawer in the closed position are possible, such as via a spring-loaded ball detent, gas spring, pneumatic cylinder, or torque-controlled electric actuator.

For example, as illustrated with respect to FIG. 7C, in the closed position, the back surface of flow cell access drawer contacts light engine 225 via kinematic locators 250 and 252 (not shown in FIGS. 8A and 8B). Through kinematic locators 250 and 252, the forward force of first spring 226 and second spring 228 is applied to flow cell access drawer 212. Therefore, a force applied by leaf spring 272 on roller 274 is greater than the force of first spring 226 and second spring 228 on flow cell access drawer 212. As a result, once the detent 275 of leaf spring 272 catches against roller 274, flow cell access drawer 212 is held in the closed position without additional fixings (e.g., latches or screws). Therefore, as illustrated in FIGS. 5 and 7C, while in the closed position, light engine 225 is spring-loaded, with first arm 227 lifted from first seat 231 and second arm 229 lifted from second seat 233. To open flow cell access drawer 212 from the closed position, the operator may pull flow cell access drawer 212 forward with a force greater than the force of leaf spring 272 on roller 274 so that roller 274 is disengaged from the detent 275 of leaf spring 272.

To further illustrate the optical alignment of SLM 240 of light engine 225 with capillary 218 of flow cell 216 while flow cell access drawer 212 is in the closed position, SLM 240 and light engine 225 will be described in further detail. First, FIG. 9 shows a detailed view of SLM 240. SLM 240 includes a plurality of light emitters. In the example illustrated herein, SLM 240 includes a plurality of light emitting diodes (LEDs). However, other light emitters are possible, such as laser diodes. SLM 240 includes two radial LED arrays 280a and 280b arranged on a substrate 241. In one example, substrate 241 may be a laser etched substrate. Radial LED arrays 280a and 280b may each include a plurality of LEDs. For example, radial LED arrays 280a and 280b are each shown including four LEDs, although more or fewer LEDs may be included. For example, radial LED array 280a includes a centrally located LED 282a having a first emission wavelength (e.g., 255 nm), and radial LED array 280b includes a matched, centrally located LED 282b having the first emission wavelength. Each additional, peripherally located LED of LED array 280a (e.g., LED 284a, LED 286a, and LED 288a) may have a different emission wavelength. For example, LED 284a may emit light at 280 nm, LED 286a may emit light at 490 nm, and LED 288a may emit light at 525 nm, although it should be understood that the example wavelengths given herein are non-limiting and explanatory in purpose. Similarly, each additional LED of radial LED array 280b may be matched to an LED of radial LED array 280a. For example, LED 284b may emit light at 280 nm, LED 286b may emit light at 490 nm, and LED 288b may emit light at 525 nm to match the wavelengths of light emitted by LED 284a, LED 286a, and LED 288a, respectively. As such, radial LED array 280b may serve as a reference light source for radial LED array 280a, which may be used to interrogate the sample in capillary 218, as further described herein.

In the example of FIG. 9, radial LED arrays 280a and 280b are electrically connected in parallel, with radial LED array 280a having a first electrical connector 290a and radial LED array 280b having a second electrical connector 290b. Each of the first and second electrical connectors may include pin contacts and socket contacts, for example. However, in other examples, radial LED array 280a and 280b may be electrically connected in series. A temperature sensor 298 is shown coupled to substrate 241, temperature sensor 298 having a third electrical connector 292. Temperature sensor 298 may be used to provide feedback to the control system for thermally regulating SLM 240, for example.

Slots (e.g., holes) 294 and 296 are shown in substrate 241 near radial LED array 280a but not near radial LED array 280b. Slots 294 and 296 enable optics to be coupled to radial LED array 280a, as will be illustrated with respect to FIGS. 10 and 11. In other examples, slots may additionally or alternatively be located near radial LED array 280b to enable optics to be coupled to radial LED array 280b.

Turning now to FIG. 10, an isometric detailed view of SLM 240 installed in light engine 225 is shown. In particular, light engine 225 is shown positioned within the front surface of the housing 221 of light source module 220, and light source module 220 is shown removed from modular multi-wavelength UV-VIS detector unit 200. For example, light source module 220 may be removed from modular multi-wavelength UV-VIS detector unit 200 so that a different light source module may be inserted into the detector unit. For example, a user may remove light source module 220 from modular multi-wavelength UV-VIS detector unit 200 by removing access panel 204 (as shown in FIG. 2) and releasing a retaining means (e.g., a fastener or clip) as well as first fastener 235 and second fastener 237 (e.g., shown in FIG. 5). Then, the user may insert a different light source module into modular multi-wavelength UV-VIS detector unit 200. The different light source module may include functionally similar components to light source module 220 but may include different optics and/or produce light in a different spectral range, for example. Furthermore, the optional second light source module 271 shown in FIG. 4 may be removed or replaced in an analogous manner. Light source module 220 and second light source module 271 may be removed or replaced independently from each other, such that light source module 220 may be removed from UV-VIS detector unit 200 while second light source module 271 remains inserted in and fixedly coupled to UV-VIS detector unit 200 and vice versa.

Additionally or alternatively, light source module 220 may be removed from modular multi-wavelength UV-VIS detector unit 200 for light source module maintenance by a service technician, such as to replace an LED, install a different SLM, upgrade the SLM (e.g., by adding additional LEDs), or change the optics coupled to the SLM. SLM 240 may be clamped into a corresponding recess in the front wall 239 of light engine 225 during installation, for example, to ensure adequate thermal bonding and optical and mechanical alignment.

Spherical lens 242 is shown coupled in front of radial LED array 280a with reflector 246 surrounding spherical lens 242. Reflector 246 includes a plurality of symmetrically shaped and/or positioned elements radially surrounding lens 242, which may include reflector elements (such as mirrors) and/or one or more alignment tabs (such as mounting arm 244). For example, reflector 246 is shown having a plurality of surface mirrors 247 (only one of which is labeled). In the example of FIG. 10, reflector 246 is shown as a faceted polygon (e.g., a hexagon). However, other geometries are also possible, including a truncated cone, a paraboloid, an ellipsoid, and a hyperboloid. Reflector 246 and the radial configuration allow the LEDs of radial LED array 280a to transmit light through and/or around spherical lens 242 to flow cell 216 (not shown in FIG. 10) with or without bouncing, as will be further described with respect to FIG.

14. Note that the peripherally located LEDs (e.g., LEDs 284a, 286a, and 288a shown in FIG. 9) may be positioned at the center of each facet or at the corner between facets. Furthermore, slots 295 and 297 in reflector 246, which correspond to slots 294 and 296 in substrate 241, respectively (e.g., as shown in FIG. 9), enable reflector 246 to be coupled to substrate 241, such as via pins. As described above, mounting arm 244 holds spherical lens 242 against substrate 241 and within reflector 246. Together, spherical lens 242 and reflector 246 combine emission from multiple light sources (e.g., the plurality of LEDs in radial LED array 280a) and may be referred to as a wavelength mixing optics (WMO) system, as further described with respect to FIG. 14. Furthermore, an additional kinematic locator 254 is shown coupled to light engine 225 in the view shown in FIG. 10.

FIG. 11 shows a front view of SLM 240 installed in light engine 225. In particular, FIG. 11 highlights the arrangement of LEDs 282a, 284a, 286a, and 288a of radial LED array 280a behind spherical lens 242. While the centrally located LED 282a may transmit light directly through spherical lens 242, light from LEDs 288a, 286a, and 288a may be reflected by a surface mirror 247 of reflector 246 to be directed through spherical lens 242.

FIGS. 12 and 13 illustrate an alignment of light engine 225 with flow cell access drawer 212 during closing. In particular, FIG. 12 shows a first angled view highlighting the front surfaces of components of light engine 225 within light source module 220, and FIG. 13 shows a second angled view highlighting the back surfaces of components of flow cell access drawer 212. Various components of light engine 225 and module 220 are shown as transparent/semi-transparent for visual purposes. Kinematic locators 250, 252, and 254, primarily illustrated in FIG. 12, align with corresponding alignment (e.g., locating) features 251, 253, and 255, respectively, shown in FIG. 13. Alignment features 251, 253, and 255 may be a combination of cones, grooves, and pads to provide exact constraints against translation and rotation in six degrees of freedom, for example. As shown in FIG. 13, alignment feature 251 may be elliptical- or oval-shaped, which may restrict movement of the corresponding kinematic locator (e.g., locator 250) in the horizontal direction (right to left) but allow some movement of the kinematic locator (and hence SLM 240 and associated components of the light engine) in the vertical direction (top to bottom). Alternative methods of kinematic constraints may be provided by three radial grooves or by other locating features.

When kinematic locators 250, 252, and 254 enter alignment features 251, 253, and 255 during closing, alignment features 251, 253, and 255 restrict the horizontal (e.g., left and right) and vertical (e.g., top and bottom) movement of kinematic locators 250, 252, and 254, thereby restricting the horizontal and vertical movement of light engine 225. As a result, light emitted by radial LED array 280a is aligned with capillary 218 (not shown in FIGS. 12 and 13), and light emitted by radial LED array 280b is aligned with a reference detector 262, which is coupled to the back of flow cell access drawer 212. For example, the light emitted by radial LED array 280b may not pass through capillary 218 and the sample therein, but may instead be transmitted directly to reference detector 262. Reference detector 262 may operate similarly to signal detector 260, outputting a voltage relative to an intensity of light detected. The control system may correlate fluctuations in light intensity measured by reference detector 262 with fluctuations in light intensity measured by signal detector 260 to generate a reference correction, for example, for a more accurate sample absorbance measurement.

Figure 14:
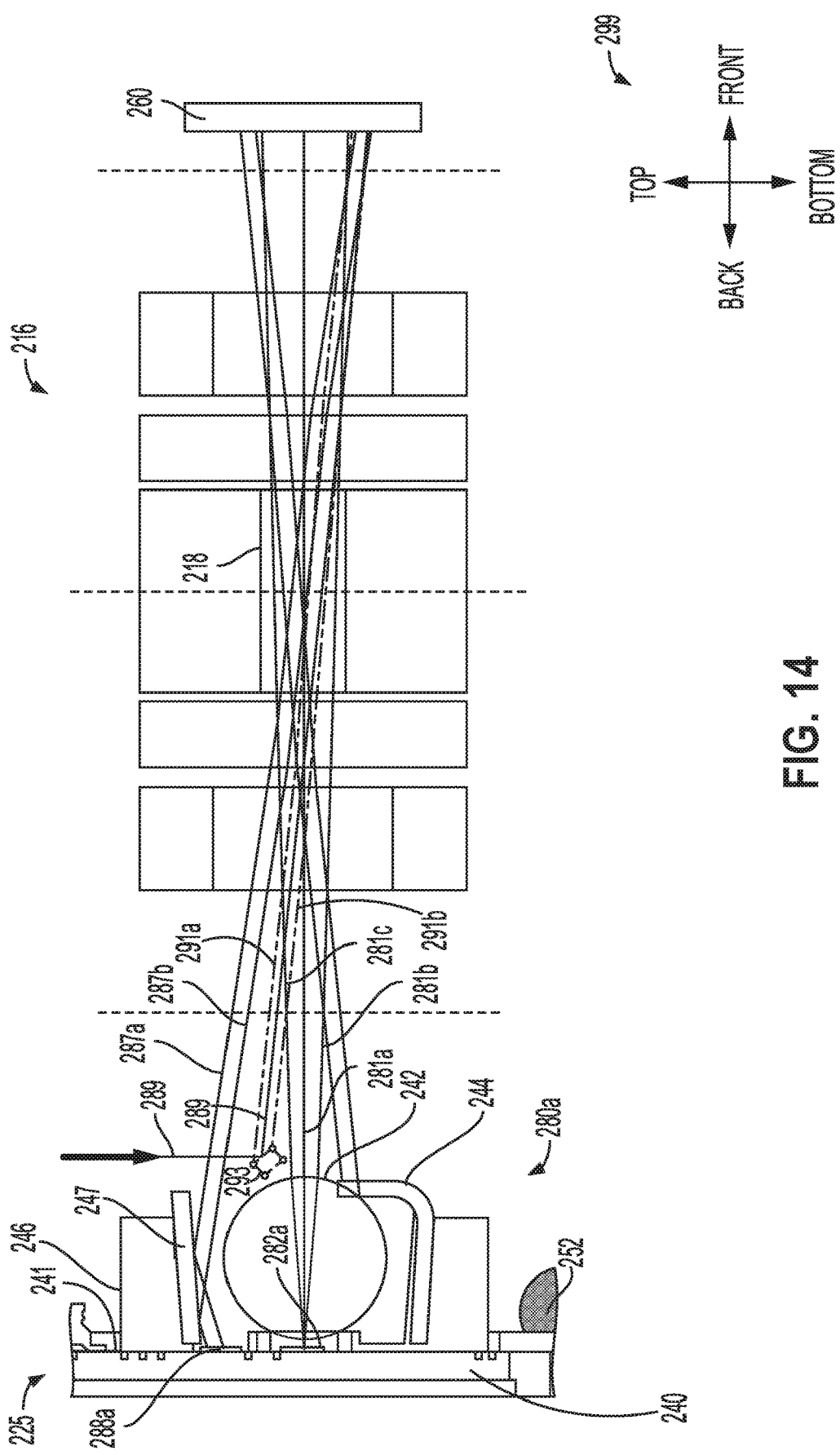
FIG. 14 shows a side section view illustrating optical paths from the semi-conductor light matrix through the flow cell of the modular multi-wavelength UV-VIS detector unit.

FIG. 14 shows a side section view illustrating a plurality of light paths from the LEDs of radial LED array 280a through capillary 218 of flow cell 216 and to signal detector 260. Flow cell 216 is diagrammed in an exploded view. As such, while space is shown between components of flow cell 216, in other examples, the components may be in face-sharing contact. Additionally, a light path 289 from a light source of second light source module 271, which may be optionally included in modular multi-wavelength UV-VIS detector unit 200 (e.g., as shown in FIG. 2), is shown. The light source of second light source module 271 may comprise a laser and light path 289 may comprise a laser beam, for example. The light source of the second light source module 271 may emit light vertically downward, toward the bottom of modular multi-wavelength UV-VIS detector unit 200 (as shown by reference axes 299). A mirror 293 may be included to bounce (e.g., redirect) light path 289 toward the front of modular multi-wavelength UV-VIS detector unit 200, through capillary 218 to signal detector 260. Additionally, light paths 291a and 291b show an envelope (possible extension) of light path 289 that is reflected by mirror 293. Mirror 293 may be sized and positioned such that light path 289 from the second light source is efficiently redirected through capillary 218 while the plurality of light paths from the LEDs of radial LED array 280a are not blocked or obstructed. For example, mirror 293 is shown positioned horizontally in front of spherical lens 242. Additional mirrors will be shown below with respect to FIG. 15.

As elaborated below, spherical lens 242 captures the light from LED 282a and projects it through capillary 218 to signal detector 260. Conversely, the majority of light emitted by LED 288a travels in an indirect light path, first reflecting off of a surface mirror 247 of reflector 246 before traveling through capillary 218 at an angle to signal detector 260.

For example, emission from multiple LEDs (e.g., LEDs 282a, 284a, 286a, and 288a show in FIG. 9) travels through the common WMO system (e.g., spherical lens 242 and reflector 246) and sample interrogation region (e.g., capillary 218) before reaching signal detector 260. In particular, the configuration of radial LED array 280a, the WMO system, capillary 218, and detector 260 may be such to provide satisfactory throughput or signal-to-noise ratio (SNR) to achieve a sample detection goal, such as a target linear range, lower limit of detection, etc. An efficiency of coupling the source emission (e.g., from each of LEDs 282a, 284a, 286a, and 288a) to signal detector 260 is termed "coupling efficiency" or "optical throughput." Because capillary 218 is constrained to a narrow passage within flow cell 216, which may be comprised of a material with high optical loss or absorption, high efficiency or throughput is achieved by the WMO system both focusing the emission within an entrance (e.g., aperture) to capillary 218 and also forming a semi-collimated beam through capillary 218 with minimal interaction with the walls of the capillary. The centrally located LED, LED 282a, has the highest coupling efficiency of the plurality of LEDs of radial LED array 280a. Therefore, LED 282a may be the weakest light emitter of radial LED array 280a, with the increased coupling efficiency compensating for the decreased optical power of LED 282a to balance the detected signal strength between LED 282a and the stronger, peripherally located light sources (e.g., LEDs 284a, 286a, and 288a).

The use of spherical lens 242 in the WMO system is advantageous due to its low part cost, ease of assembly due to its omnidirectional effectiveness, and extremely short back focal distance to form a compact optical system. For example, spherical lens 242 captures wide angle emission (e.g., high emission capture efficiency) from the LEDs of radial LED array 280a with an emission pattern similar to the well-known Lambertian distribution. Spherical lens 242 projects a semi-collimated beam from centrally located LED 282a that is on-axis with capillary 218 since LED 282a is located in close proximity to the focal point of the lens. However, the emission of the peripheral light sources (e.g., LEDs 284a, 286a, and 288a) may be projected by spherical lens 242 in off-axis directions from capillary 218, which cannot be used for sample interrogation. Therefore, while the optical throughput for centrally located LED 282a is increased, the coupling efficiencies of the peripheral LEDs may be degraded by two or more orders of magnitude. However, this degradation may be avoided by changing the arrangement of the peripheral light sources (e.g., including the plurality of LEDs in a tighter array so that emission from the peripheral light sources will go through spherical lens 242), altering the size and location of spherical lens 242 (such as by increasing the diameter of the lens so that a wider angle of emission is captured), or by including reflector 246 in the WMO system, as shown. Reflector 246 allows emission from the peripheral LEDs (such as LED 288a shown in FIG. 14) to "bounce around" and avoid spherical lens 242 on its path to signal detector 260. For example, rays emitted by centrally located LED 282a in are shown in FIG. 14 as light paths 281a, 281b, and 281c, and rays emitted by peripheral LED 288a are shown in light paths 287a and 287b. The rays emitted by peripheral LED 288a in light paths 287a and 287b bounce around spherical lens 242 (e.g., without traveling through spherical lens 242) before being directed to capillary 218 by a surface mirror 247 of reflector 246. In this way, a highly compact multi-wavelength light source that comprises of multiple discrete light sources (e.g., the plurality of LEDs) and the WMO system is achieved.

The diameter of spherical lens 242 may range from 3 to 8 millimeters and may be selected based on the dimensions of each LED in the radial LED array, which may range from around 100 microns to 5 millimeters. As a non-limiting example, LED 282a may have a dimension of 1 millimeter, with spherical lens 242 having a diameter of 4 millimeters to support centrally located LED 282a and up to eight peripheral LEDs in a ring arrangement, such as LED 288a shown in FIG. 14. The combination of the size of spherical lens 242 and the dimension of the LEDs may be optimized via geometric ray tracing or analysis, for example. Further, as a non-limiting example, capillary 218 may have a diameter of around 2 millimeters and a length between 5 and 10 millimeters. Therefore, the total length (e.g., from back to front) of the optical train shown in FIG. 14 may be about 30 millimeters.

The optical throughputs for the centrally located LED 282a and the peripherally located LED 288a may be about 3% and 0.2%, respectively, for a flow cell having a pathlength of 5 millimeters. In comparison, the direct coupling efficiency of the LED 282a without spherical lens 242 (or any lens) may be about 0.2%, and the efficiency of LED 288a with a different, non-spherical lens boosting the efficiency of LED 282a may be degraded to about 0.01% or lower. Therefore, the example optical design illustrated in FIG. 14 may provide more than 10 times greater efficiency for both LED 282a and LED 288a (among the other peripherally located LEDs of radial LED array 280a) by using a common WMO system.

In an alternative example of the WMO system, the peripherally located LEDs may be aggregated closer to centrally located LED 282a so that the emission from each peripheral LED goes through spherical lens 242 before reaching signal detector 260. For example, a center-to-center distance between each peripheral LED with LED 282a may be reduced, and a spherical lens with a larger diameter may be used. Additionally, the peripheral LEDs (such as LED 288a) may be elevated from substrate 241 so that the peripherally located LEDs are no longer co-planar with LED 282a. For example, the peripherally located LEDs may be elevated (e.g., in the horizontal direction toward the front) by about 0.5 millimeters so that the front surface of each peripheral LED is closer to the surface of spherical lens 242. For example, each peripheral LED may be elevated using an adaptor board or structured substrate coupled to substrate 241. By raising the peripherally located LEDs closer to the surface of spherical lens 242, the coupling efficiency may be increased about 15-fold. Alternatively, an optical waveguide, such as a hollow waveguide or a solid waveguide with a cross section similar to the LEDs and having a length that matches the height of elevation, may be attached to the top of each peripherally located LED to virtually raise the emitting surface. For example, capillaries with reflective inner or outer surfaces may be used as the hollow waveguide, and UV-grade optical fiber or fused silica rod may be used as the solid waveguide. A circular waveguide may be used for the square-shaped LEDs, but the cross section mismatch may reduce the efficiency. In this approach, the efficiency of centrally located LED 282a may be increased to 4%, and the efficiency of peripherally located LED 288a may be increased to 1.5% for a 5 millimeter flow cell, in one example.

FIG. 15 shows a side section view illustrating the light path 289 from second light source module 271, which may be reflected around light engine 225 via a series of mirrors. The mirrors may be folding mirrors positioned outside of light engine 225, for example, and may be coupled to housing 221 of light source module 220 and/or a housing of UV/VIS detector unit 200. Second light source module 271 may emit light path 289 vertically downward, toward light engine 225 and the bottom of UV-VIS detector unit 200, as shown by reference axes 299. A first mirror 223 may be positioned vertically above light engine 225 to redirect light path 289 toward the front of the UV-VIS detector unit (e.g., forward) before light path 289 reaches light engine 225. For example, first mirror 223 may reflect light path 289 at a right angle, such that first mirror 223 receives light path 289 traveling vertically downward (e.g., at an angle of −90°) and redirects light path 289 so that light path 289 travels horizontally forward (e.g., at an angle of 0°). A second mirror 263 may be positioned to redirect light path 289, reflected by first mirror 223, downward toward mirror 293 positioned in front of spherical lens 242. Second mirror 263 may reflect light path 289 at another right angle, for example, such that second mirror 263 receives light path 289 traveling horizontally forward (e.g., at an angle of 0°) and redirects light path 289 so that light path 289 travels vertically downward (e.g., at an angle of −90°). Mirror 293 may then redirect light path 289 toward flow cell 216 and through capillary 218, as described above with respect to FIG. 14. In this way, first mirror 223 and second mirror 263 may direct light emitted by second light source module 271 in light path 289 around light engine 225 of light source module 220 and to mirror 293, which then directs the light in light path 289 through a sample flowing through flow cell 216 and to signal detector 260 (not shown in FIG. 15).

Overall, by including a light source module comprising a SLM in a modular multi-wavelength UV-VIS detector unit (e.g., modular multi-wavelength UV-VIS detector unit 200) instead of a deuterium lamp, for example, an optical power of the light source module may be increased. For example, referring to FIG. 16, a graph 1600 shows power spectra of a plurality of LEDs (plots 1602a-1602m) compared to a power spectrum of a deuterium lamp (plot 1604). The horizontal axis represents the wavelength of light emitted, and the vertical axis represents the relative power of the emitted light. Each of the plots 1602a, 1602b, 1602c, 1602d, 1602e, 1602f, 1602g, 1602h, 1602i, 1602j, 1602k, 1602l, and 1602m represents a power spectrum of an individual LED that may be included in the SLM. For example, each individual LED has a narrow emission spectrum having a distinct relative power maximum (e.g. peak) whereas the deuterium lamp has a broad emission spectrum with generally low relative power. For example, at the wavelength indicated by dashed line 1606 (e.g., between 375 and 400 nm), the LED emitting the power spectrum of plot 1602e outputs one hundred times more power than the deuterium lamp.

In this way, by including LEDs instead of a deuterium lamp as a light source of a UV-VIS detector unit, more light may be transmitted through a sample due to the higher relative power of the LEDs, resulting in higher accuracy sample absorbance measurements by the UV-VIS detector. For example, for samples with a very high specific absorbance at a given wavelength, deuterium/tungsten lamp systems lose linearity, as very little light passes through the flow cell to the signal detector. With LEDs, more light from the light source means more light passes through the sample to reach the signal detector, increasing the linear range of the detector.

Furthermore, by including the LEDs in a light source module of the UV-VIS detector unit, the light source module (and the UV-VIS detector unit) to be upgraded, expanded, or otherwise customized by a user (instead of a service technician) in order to change a spectral range of the UV-VIS detector unit. In this way, a range of chemical entities may be interrogated using the same, modular UV-VIS detector unit without disassembly of the detector unit and without paying service technician fees. By including a movable flow cell access drawer, both a flow cell and the light source module may be accessed by the user (e.g., while the flow cell access drawer is opened) while an optical path between the light source module and a signal detector is shortened (e.g., while the flow cell access drawer is closed). By shortening the optical path, the attenuation of light traveling to the flow cell is decreased, the light has a wider angle of entry into the flow cell, and the light has a wider angle of exit out of the flow cell without reflection or absorption at the inner walls of the flow cell. As a result, more light interacts with the sample and reaches the signal detector compared with when the optical path is longer, leading to higher accuracy sample absorbance measurements. By including the LEDs in a spring-loaded light engine having kinematic locators, the LEDs and additional optical components coupled thereto may be precisely aligned with the flow cell and the signal detector.

As one example, a detector unit for an analyzer comprises: one or more light emitters; and a sliding assembly configured to slidingly move a flow cell relative to the one or more light emitters, the one or more light emitters mounted on a floating rig to facilitate alignment between the one or more light emitters and the flow cell when the sliding assembly is in a closed position. In the preceding example, additionally or optionally, the floating rig comprises a front wall coupled to the one or more light emitters, an arm coupled to the front wall, a shaft coupled to a seat, and a spring wound around the shaft, the arm configured to translate along the shaft. In one or both of the preceding examples, the detector unit further comprises a signal detector coupled to the sliding assembly, the signal detector configured to slidingly move with the flow cell relative to the one or more light emitters, and wherein the floating rig facilitates alignment between the one or more light emitters, the flow cell, and the signal detector when the sliding assembly is in the closed position; and a controller configured to receive output from the signal detector, the output from the signal detector usable to determine an absorbance of a sample within the flow cell. In any or all of the preceding examples, additionally or optionally, the one or more light emitters comprise one or more light emitting diodes (LEDs) mounted on a substrate, the substrate mounted to the floating rig, the one or more LEDs mounted in a radial array. In any or all of the preceding examples, the detector unit additionally or optionally further comprises a spherical lens positioned in front of the one or more LEDs and a radial reflector at least partially surrounding the spherical lens. In any or all of the preceding examples, additionally or optionally, the flow cell is housed in a flow cell assembly configured to be positioned in the sliding assembly, and when the flow cell assembly is positioned in the sliding assembly and the sliding assembly is in the closed position, the one or more LEDs are configured to emit light along a light path that passes through the sample within the flow cell en route to the signal detector. In any or all of the preceding examples, additionally or optionally, the flow cell assembly is configured to be removed from the sliding assembly when the sliding assembly is in an open position.

As another example, a UV-VIS detector unit comprises: a detector unit housing; one or more light emitters coupled to a substrate, the one or more light emitters movable relative to the detector unit housing via a compliant structure; a signal detector; and a flow cell access drawer configured to receive a flow cell housing a sample, the flow cell access drawer slidingly movable into and out of the detector unit housing, the flow cell access drawer configured to position the flow cell between the one or more light emitters and the signal detector such that light from the one or more light emitters is configured to pass through a capillary of the flow cell en route to the signal detector. In the preceding example, the UV-VIS detector unit additionally or optionally further comprises one or more kinematic locators coupled to the compliant structure and one or more complementary locating features positioned on the flow cell access drawer, and wherein the signal detector is positioned on an outer side of the flow cell access drawer. In one or both of the preceding examples, additionally or optionally, the one or more light emitters comprise a first light emitter and two or more additional light emitters arranged radially around the first light emitter. In any or all of the preceding examples, additionally or optionally, the compliant structure comprises a front wall configured to accommodate the substrate and the one or more light emitters coupled thereto and a compliant member coupled between the front wall and the detector unit housing. In any or all of the preceding examples, additionally or optionally, the complaint structure further includes a first arm and a second arm each coupled to the front wall, a first spring coupled to the first arm, and a second spring coupled to the second arm. In any or all of the preceding examples, the UV-VIS detector unit additionally or optionally further comprises a light module housing in which the light engine is arranged, the light module housing fixedly coupled to the detector unit housing, wherein the first arm is configured to translate along a first shaft coupled to a first seat, the first seat coupled to the light module housing, the first spring wound around the first shaft and configured to apply a spring force to the first arm and bias the light engine toward the flow cell access drawer.

As another example, a detector unit for a liquid chromatography system, comprises: a detector unit housing; one or more light emitters coupled to a substrate, the one or more light emitters movable relative to the detector unit housing via a spring-loaded mechanism; a signal detector; a flow cell access drawer configured to receive a flow cell housing a sample, the flow cell access drawer slidingly movable into and out of the detector unit housing, the flow cell access drawer configured to position the flow cell between the one or more light emitters and the signal detector, light from the one or more light emitters configured to pass through a capillary of the flow cell en route to the signal detector; and a sliding wall coupled to the flow cell access drawer and positioned within the detector unit housing, the sliding wall configured to hold the flow cell access drawer in a closed position when engaged by a coupling force. In the preceding example, additionally or optionally, the one or more light emitters and substrate are coupled to a front wall of the spring-loaded mechanism, the spring-loaded mechanism configured to bias the front wall toward the flow cell access drawer. In one or both of the preceding examples, additionally or optionally, the sliding wall is configured to hold the flow cell access drawer in the closed position when a detent of a leaf spring coupled to the sliding wall engages with a roller, and wherein the detent engages the roller to hold the flow cell access drawer closed with a greater force than a force provided by the biasing of the spring-loaded mechanism. In any or all of the preceding examples, additionally or optionally, the sliding wall is configured to hold the flow cell access drawer in the closed position via a spring-loaded ball detent, gas spring, pneumatic cylinder, or torque-controlled electric actuator. In any or all of the preceding examples, additionally or optionally, the one or more light emitters coupled to the substrate include an array of light emitting diodes, the array of light emitting diodes including at least three light emitting diodes arranged radially around a central light emitting diode. In any or all of the preceding examples, additionally or optionally, the array is a first array, and further comprising: a second array of light emitting diodes coupled to the substrate; a reference detector, light emitted by the second array of light emitting diodes configured to reach the reference detector; a temperature sensor coupled to the substrate intermediate the first array and second array; and a thermal control unit coupled to the substrate. In any or all of the preceding examples, additionally or optionally, the thermal control unit comprises a heat spreader, thermal module, and heat sink.

In another representation, a detector unit for an analyzer comprises a plurality of radially-mounted light-emitting diodes (LEDs) positioned to interface with a flow cell sample. In the preceding example, additionally or optionally, the plurality of radially-mounted LEDs are mounted on a substrate and include at least three LEDs mounted on the substrate radially around a central LED. In one or both of the preceding examples, the detector unit further comprises a spherical lens positioned in front of the plurality of radially-mounted LEDs and a radial reflector at least partially surrounding the spherical lens.

In another representation, a detector unit for an analyzer comprises: a floating light source comprising a first plurality of LEDs radially mounted on a substrate and a second plurality of LEDs radially mounted on the substrate; a sliding element configured to slidingly move a flow cell sample relative to the light source, the sliding drawer configured to be held in a closed position by a detent of a leaf spring engaging with a roller; a radial tab coupled to the substrate and surrounding a lens, the lens positioned between the first plurality of LEDs and the sliding element; a temperature sensor mounted on the substrate; and a controller configured to adjust a thermal control device coupled to the substrate based on output from the temperature sensor. In the preceding example, the detector unit additionally or optionally further comprises a signal detector and a reference detector each coupled to the sliding element, and when the sliding element is in a closed position, the first plurality of LEDs are configured to emit light along a light path through the flow cell sample and to the signal detector and the second plurality of LEDs is configured to emit light to the reference detector.

In another representation, a detector unit for an analyzer comprises: a first light source module removably coupled in the detector unit; a second light source module removably coupled in the detector unit; and a sliding assembly configured to slidingly move a flow cell relative to the first light source module, the first light source module including a floating rig to facilitate alignment between the first light source module and the flow cell when the sliding assembly is in a closed position. In the preceding example, additionally or optionally, the second light source module is positioned vertically above the first light source module within a housing of the detector unit. In one or both of the preceding examples, additionally or optionally, the first light source module includes a plurality of light-emitting diodes coupled to the floating rig and the second light source module includes a laser. In any or all of the preceding examples, additionally or optionally, a plurality of mirrors direct light emitted by the laser of the second light source module around the floating rig of the first light source module and toward the flow cell.

In still another representation, a light source for an analyzer comprises: a plurality of LEDs radially mounted on a substrate; a lens positioned in front of the plurality of LEDs; a reflector comprising a plurality of surface mirrors radially arranged around the lens; and a mounting arm holding the lens against the substrate and within the reflector.

As used herein, an element or step recited in the singular and proceeded with the word "a" or "an" should be understood as not excluding plural of said elements or steps, unless such exclusion is explicitly stated. Furthermore, references to "one example" of the present invention are not intended to be interpreted as excluding the existence of additional examples that also incorporate the recited features. Moreover, unless explicitly stated to the contrary, examples "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A detector unit for an analyzer, comprising:
one or more light emitters; and
a sliding assembly configured to slidingly move a flow cell relative to the one or more light emitters, the one or more light emitters mounted on a floating rig to facilitate alignment between the one or more light emitters and the flow cell when the sliding assembly is in a closed position, wherein the floating rig comprises a front wall coupled to the one or more light emitters, an arm coupled to the front wall, a shaft coupled to a seat, and a spring wound around the shaft, the arm configured to translate along the shaft.

2. The detector unit of claim 1, further comprising:
a signal detector coupled to the sliding assembly, the signal detector configured to slidingly move with the flow cell relative to the one or more light emitters, and wherein the floating rig facilitates alignment between the one or more light emitters, the flow cell, and the signal detector when the sliding assembly is in the closed position; and
a controller configured to receive output from the signal detector, the output from the signal detector usable to determine an absorbance of a sample within the flow cell.

3. The detector unit of claim 2, wherein the one or more light emitters comprise one or more light emitting diodes (LEDs) mounted on a substrate, the substrate mounted to the floating rig, the one or more LEDs mounted in a radial array.

4. The detector unit of claim 3, further comprising a spherical lens positioned in front of the one or more LEDs and a radial reflector at least partially surrounding the spherical lens.

5. The detector unit of claim 3, wherein the flow cell is housed in a flow cell assembly configured to be positioned in the sliding assembly, and when the flow cell assembly is positioned in the sliding assembly and the sliding assembly is in the closed position, the one or more LEDs are configured to emit light along a light path that passes through the sample within the flow cell en route to the signal detector.

6. The detector unit of claim 5, wherein the flow cell assembly is configured to be removed from the sliding assembly when the sliding assembly is in an open position.

7. A UV-VIS detector unit, comprising:
a detector unit housing;
one or more light emitters coupled to a substrate, the one or more light emitters movable relative to the detector unit housing via a compliant structure comprising a front wall configured to accommodate the substrate and the one or more light emitters coupled thereto and a compliant member coupled between the front wall and the detector unit housing;
a signal detector; and
a flow cell access drawer configured to receive a flow cell that houses a sample, the flow cell access drawer slidingly movable into and out of the detector unit housing, the flow cell access drawer configured to position the flow cell between the one or more light emitters and the signal detector such that light from the one or more light emitters is configured to pass through a capillary of the flow cell en route to the signal detector.

8. The UV-VIS detector of claim 7, further comprising one or more kinematic locators coupled to the compliant structure and one or more complementary locating features positioned on the flow cell access drawer, and wherein the signal detector is positioned on an outer side of the flow cell access drawer.

9. The UV-VIS detector unit of claim 7, wherein the one or more light emitters comprise a first light emitter and two or more additional light emitters arranged radially around the first light emitter.

10. The UV-VIS detector unit of claim 7, wherein the complaint structure further includes a first arm and a second arm each coupled to the front wall, a first spring coupled to the first arm, and a second spring coupled to the second arm.

11. The UV-VIS detector unit of claim 10, further comprising a light module housing in which the compliant structure is arranged, the light module housing fixedly coupled to the detector unit housing, wherein the first arm is configured to translate along a first shaft coupled to a first seat, the first seat coupled to the light module housing, the first spring wound around the first shaft and configured to apply a spring force to the first arm and bias the compliant structure toward the flow cell access drawer.

12. A detector unit for a liquid chromatography system, comprising:
a detector unit housing;
one or more light emitters coupled to a substrate, the one or more light emitters movable relative to the detector unit housing via a spring-loaded mechanism;
a signal detector;
a flow cell access drawer configured to receive a flow cell housing a sample, the flow cell access drawer slidingly movable into and out of the detector unit housing, the flow cell access drawer configured to position the flow cell between the one or more light emitters and the signal detector, light from the one or more light emitters configured to pass through a capillary of the flow cell en route to the signal detector; and
a sliding wall coupled to the flow cell access drawer and positioned within the detector unit housing, the sliding wall configured to hold the flow cell access drawer in a closed position when engaged by a coupling force.

13. The detector unit of claim 12, wherein the one or more light emitters and the substrate are coupled to a front wall of the spring-loaded mechanism, the spring-loaded mechanism configured to bias the front wall toward the flow cell access drawer.

14. The detector unit of claim 12, wherein the sliding wall is configured to hold the flow cell access drawer in the closed position when a detent of a leaf spring coupled to the sliding wall engages with a roller, and wherein the detent engages the roller to hold the flow cell access drawer closed with a greater force than a force provided by the biasing of the spring-loaded mechanism.

15. The detector unit of claim 12, wherein the sliding wall is configured to hold the flow cell access drawer in the closed position via a spring-loaded ball detent, gas spring, pneumatic cylinder, or torque-controlled electric actuator.

16. The detector unit of claim 12, wherein the one or more light emitters coupled to the substrate include an array of light emitting diodes, the array of light emitting diodes including at least three light emitting diodes arranged radially around a central light emitting diode.

17. The detector unit of claim 16, wherein the array is a first array, and further comprising:
a second array of light emitting diodes coupled to the substrate;

a reference detector, light emitted by the second array of light emitting diodes configured to reach the reference detector;
a temperature sensor coupled to the substrate intermediate the first array and the second array; and
a thermal control unit coupled to the substrate.

18. The detector unit of claim 17, wherein the thermal control unit comprises a heat spreader, thermal module, and heat sink.

* * * * *